United States Patent
Sato

(10) Patent No.: US 8,483,021 B2
(45) Date of Patent: Jul. 9, 2013

(54) MEDIUM DELIVERY CONTROL APPARATUS, MEDIUM DELIVERY CONTROL METHOD AND PROGRAM

(75) Inventor: Shin Sato, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 13/521,957

(22) PCT Filed: Jan. 12, 2011

(86) PCT No.: PCT/JP2011/050311
§ 371 (c)(1),
(2), (4) Date: Jul. 12, 2012

(87) PCT Pub. No.: WO2011/087005
PCT Pub. Date: Jul. 21, 2011

(65) Prior Publication Data
US 2012/0294127 A1   Nov. 22, 2012

(30) Foreign Application Priority Data
Jan. 13, 2010   (JP) .................................. 2010-005156

(51) Int. Cl.
*G11B 17/22* (2006.01)
*G11B 15/68* (2006.01)

(52) U.S. Cl.
USPC .................................... 369/30.37; 369/30.42

(58) Field of Classification Search
USPC .............. 369/30.1, 30.3, 30.32, 30.35, 30.37, 369/30.42, 30.85, 30.47, 30.53, 30.55, 30.54; 360/92.1, 91, 69
See application file for complete search history.

(56) References Cited

U.S. PATENT DOCUMENTS

| 6,553,456 B2 * | 4/2003 | Tadokoro et al. .............. 711/112 |
| 7,158,326 B2 * | 1/2007 | Hanagata ........................ 360/69 |
| 2009/0238055 A1 | 9/2009 | Kawasaki |
| 2009/0249375 A1 | 10/2009 | Itamoto |

FOREIGN PATENT DOCUMENTS

| JP | 2008-130098 A | 6/2008 |
| JP | 2009-230791 A | 10/2009 |
| JP | 2009-238260 A | 10/2009 |

* cited by examiner

*Primary Examiner* — Nabil Z Hindi
(74) *Attorney, Agent, or Firm* — Sughrue Mion, PLLC

(57) ABSTRACT

Provided is a medium delivery control apparatus that can prevent the wear of a means relating to the delivery of a recording medium and extend the life of the delivery means. The medium delivery control device controls a medium delivery means for connecting, disconnecting and delivering the recording medium with respect to a deep cell, and includes a first detection recording means for detecting and recording the storage or non-storage of the recording media and the identity of the recording media being stored for each deep cell, a second detection recording means for detecting and recording the number of insertions and removals of the recording medium for each deep cell, a storage point candidate searching means for searching for a storage point candidate cell on the basis of the recording of the first detection recording means, a number-retrieval determining means for retrieving the number of insertions and removals of the recording media at the retrieved storage point candidate cell and determining whether the number exceeds a threshold on the basis of the recording of the second detection recording means, and a medium-delivery control means for controlling the medium delivery means such that the recording medium is delivered to the retrieved storage point candidate cell if the threshold is not exceeded.

9 Claims, 12 Drawing Sheets

MEDIUM DELIVERY CONTROL APPARATUS, MEDIUM DELIVERY CONTROL METHOD AND PROGRAM

CROSS REFERENCE TO RELATED APPLICATIONS

Figure 1:
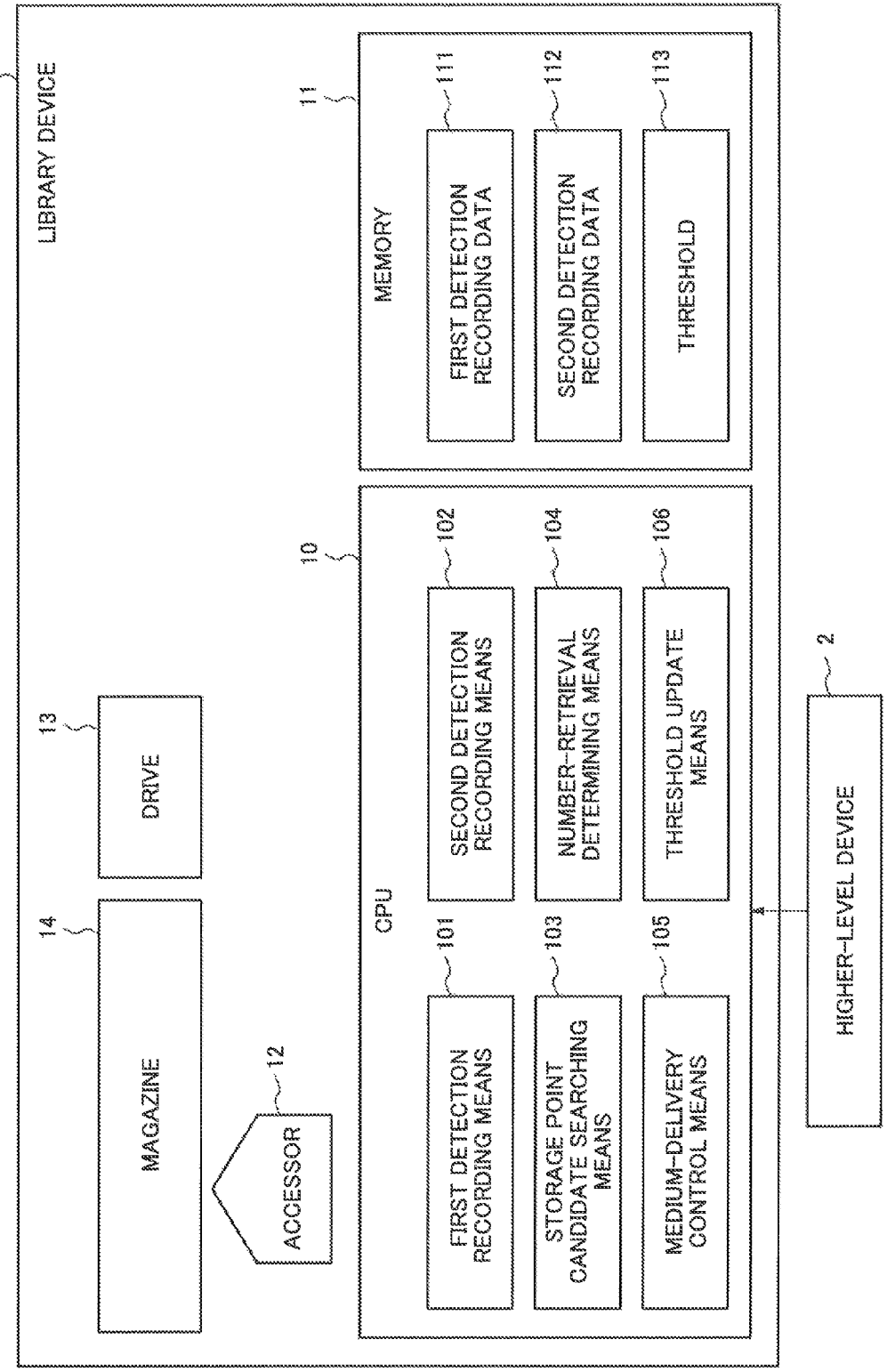

This application is a National Stage of International Application No. PCT/JP2011/050311 filed on Jan. 12, 2011, which claims priority from Japanese Patent Application No. 2010-005156, filed on Jan. 13, 2010, the contents of all of which are incorporated herein by reference in their entirety.

TECHNICAL FIELD

The present invention relates to a medium delivery control apparatus, a medium delivery control method and a program, which control a medium delivery means performing removal, insertion and delivery of a recording medium with respect to a medium storage means including a plurality of cells capable of housing the recording medium.

BACKGROUND ART

A library device of a deep cell system is currently known as an example of a medium delivery control apparatus (e.g. see Patent Literature (PTL) 1, 2). The library device of the deep cell system controls a medium delivery means (accessor mechanism) performing removal, insertion and delivery of a recording medium with respect to a medium storage means (magazine) including a plurality of deep cells capable of consecutively housing a plurality of recording media (e.g. data cartridge, like tape, disc) in a depth direction from an opening of a cell and a recording reproduction means performing reading and writing on the recording medium (drive apparatus).

Patent Literature

Patent literature (PTL) 1: JP 2009-230791 A
Patent literature (PTL) 2: JP 2009-238260 A

SUMMARY OF THE INVENTION

Problem to be Solved by the Invention

In the library device of the deep cell system, a means related to delivery of the recording medium (e.g. medium storage means, medium delivery means) is easy to wear. When the means comes to the end of its life due to wear, the cost of parts replacement and fixing is required. A specific example of wear is described below.

Wear of the medium storage means is explained. When two recording media are housed in one cell in the magazine of the deep cell system, one recording medium is housed on the back side of the cell and another recording medium is housed on the opening side thereof. In such storage condition, when an instruction to read (or write) a recording medium A housed on the back side of the cell is generated, the accessor mechanism removes a recording medium B housed on the opening side of the cell, delivers it to a different cell which is a storage destination and inserts it therein. After that, the accessor mechanism removes the recording medium A and delivers it to the drive. In order to facilitate the removing operation of the recording medium A, a medium pushing means (e.g. resilient member (e.g. spring)), which pushes a recording medium which is housed on the back side of the cell to the opening side thereof, is arranged on the back side of each cell. If removal and insertion of the recording medium which is housed on the back side of the cell are frequently performed, the function of the medium pushing means gradually decreases due to loss of resiliency thereof, and the accessor mechanism becomes less able to remove a recording medium which is housed on the back side of the cell. Even if the accessor mechanism become unable to remove the recording medium from one cell, from which a recording medium is not able to be removed, exists, the whole magazine including the cell has to be replaced.

Regarding wear of the medium delivery means is explained below. If an instruction to read (or write) the recording medium A housed on the back side of the cell is generated when one recording medium is housed on the back side of the cell and another recording medium is housed on the opening side thereof, the accessor mechanism corresponding to the magazine of the deep cell system removes the recording medium B housed on the opening side of the cell, delivers it to a different cell and inserts it therein, after that, removes the recording medium A and delivers it to the drive. After that, the accessor mechanism removes the recording medium B from the storage destination cell, delivers it to the cell in which it is originally housed and inserts it thereinto. Performing a storage operation to temporarily house the recording medium on the opening side of the cell in a different cell, the accessor mechanism corresponding to the magazine of the deep cell system moves a long distance compared with an accessor mechanism which does not correspond to the deep cell system. When a travel distance becomes long, a driving means (e.g. motor) which drives the accessor mechanism wears fast.

The present invention is made in view of the above circumstance. An object of the present invention is to provide a medium-delivery control apparatus, a medium delivery control method and a program which are able to extend the length of life by avoiding wear of a means related to recording medium delivery.

Means for Solving the Problem

In order to achieve the object, a medium delivery control apparatus means of the present invention is the medium delivery control apparatus for controlling a medium delivery means performing removal, insertion and delivery of a recording medium with respect to a medium storage means including a plurality of deep cells capable of housing a plurality of recording media in a depth direction from an opening of the cell and a recording reproduction means performing reading and writing on the recording medium, the apparatus including, a first detection recording means for detecting and recording, for each deep cell, whether or not the recording medium is housed and which the recording medium is if the recording medium is housed, a second detection recording means for detecting and recording, for each deep cell, the number of removals and insertions of the recording medium, a storage point candidate searching means for searching a storage point candidate cell storing the recording medium that is housed in at least one of a delivery source cell and a delivery destination cell on the basis of the record by the first detection recording means, a number-retrieval determining means for retrieving the number of removals and insertions of the recording medium in the storage point candidate cell searched by the storage point candidate searching means and for determining whether or not the retrieved number of times exceeds a predetermined threshold on the basis of the record by the second detection recording means, and a medium-delivery control means for controlling the medium delivery means so that the recording medium is stored in the searched storage point candidate cell if the threshold is not exceeded and for controlling the medium delivery means so that the recording medium is not stored in the searched storage point candidate cell if the threshold is exceeded, in accordance with the determination of the number-retrieval determining means.

A medium delivery control apparatus of the present invention is the medium delivery control apparatus for controlling a medium delivery means performing removal, insertion and delivery of a recording medium with respect to a medium storage means including a plurality of deep cells capable of housing a plurality of recording media in a depth direction from an opening of the cell and a recording reproduction means performing reading and writing on the recording medium, the apparatus including, a first detection recording means for detecting and recording, for each deep cell, whether or not a recording medium is housed and which the recording medium is if the recording medium is housed, a storage point candidate searching means for searching a storage point candidate cell storing the recording medium that is housed in at least one of a delivery source cell and a delivery destination cell on the basis of the record by the first detection recording means, a travel distance calculation means for calculating a travel distance of the medium delivery means required for delivery of the recording medium for each storage point candidate cell searched by the storage point candidate searching means on the basis of a position of the searched storage point candidate cell, a position of a delivery source, a position of a delivery destination and a current standby position of the medium delivery means, and a medium-delivery control means for controlling the medium delivery means so that the recording medium is stored in the storage point candidate cell, the travel distance to which is the shortest, the travel distance being calculated by the travel distance calculation means.

A medium delivery control method of the present invention is the medium delivery control method which is performed by an apparatus for controlling a medium delivery means performing removal, insertion and delivery of a recording medium with respect to a medium storage means including a plurality of deep cells capable of housing a plurality of recording media in a depth direction from an opening of the cell and a recording reproduction means performing reading and writing on the recording medium, the method including, a first detection recording step for detecting and recording, for each deep cell, whether or not a recording medium is stored and which the recording medium is if the recording medium is stored, a second detection recording step for detecting and recording the number of removals and insertions of the recording medium for each deep cell, a storage point candidate searching step for searching a storage point candidate cell storing the recording medium that is stored in at least one of a delivery source cell and a delivery destination cell on the basis of the record by the first detection recording step, a number-retrieval determining step for retrieving the number of removals and insertions of the recording medium in the storage point candidate cell searched by the storage point candidate searching step and determining whether or not the retrieved number of times exceeds a predetermined threshold on the basis of the record by the second detection recording step, and a medium delivery control step for controlling the medium delivery means so that the recording medium is stored in the searched storage point candidate cell if the threshold is not exceeded and for controlling the medium delivery means so that the recording medium is not stored in the searched storage point candidate cell if the threshold is exceeded, in accordance with the determination in the number-retrieval determining step.

A medium delivery control method of the present invention is the medium delivery control method which is performed by an apparatus for controlling a medium delivery means performing removal, insertion and delivery of a recording medium with respect to a medium storage means including a plurality of deep cells capable of housing a plurality of recording media in a depth direction from an opening of the cell and a recording reproduction means performing reading and writing on the recording medium, the method including, a first detection recording step for detecting and recording, for each deep cell, whether or not a recording medium is housed and which the recording medium is if the recording medium is housed, a storage point candidate searching step for searching a storage point candidate cell storing the recording medium that is housed in at least one of a delivery source cell and a delivery destination cell on the basis of the record by the first detection recording step, a travel distance calculation step for calculating a travel distance of the medium delivery means required for delivery of the recording medium for each storage point candidate cell searched in the storage point candidate searching step on the basis of a position of the searched storage point candidate cell, a position of a delivery source, a position of a delivery destination and a current standby position of the medium delivery means, and a medium delivery control step for controlling the medium delivery means so that the recording medium is stored in the storage point candidate cell, the travel distance to which is the shortest, the travel distance being calculated in the travel distance calculation step.

A program of the present invention is the program for controlling a medium delivery means performing removal, insertion and delivery of a recording medium with respect to a medium storage means including a plurality of deep cells capable of housing a plurality of recording media in a depth direction from an opening of the cell and a recording reproduction means performing reading and writing on the recording medium, the program causing a computer to execute first detection recording processing for detecting and recording, for each deep cell, whether or not a recording medium is housed and which the recording medium is if the recording medium is housed, second detection recording processing for detecting and recording the number of removals and insertions of the recording medium for each deep cell, storage point candidate searching processing for searching a storage point candidate cell storing the recording medium that is housed in at least one of a delivery source cell and a delivery destination cell on the basis of the record by the first detection recording processing, number-retrieval determining processing for retrieving the number of removals and insertions of the recording medium in the storage point candidate cell searched by the storage point candidate searching processing and determining whether or not the retrieved number of times exceeds a predetermined threshold on the basis of the record by the second detection recording processing, and medium delivery control processing for controlling the medium delivery means so that the recording medium is stored in the searched storage point candidate cell if the threshold is not exceeded and for controlling the medium delivery means so that the recording medium is not stored in the searched storage point candidate cell if the threshold is exceeded, in accordance with the determination by the number-retrieval determining processing.

A program of the present invention is the program for controlling a medium delivery means performing removal, insertion and delivery of a recording medium with respect to a medium storage means including a plurality of deep cells capable of housing a plurality of recording media in a depth direction from an opening of the cell and a recording reproduction means performing reading and writing on the recording medium, the program causing a computer to execute first detection recording processing for detecting and recording, for each deep cell, whether or not a recording medium is housed and which the recording medium is if the recording medium is housed, storage point candidate searching processing for searching a storage point candidate cell storing the recording medium that is housed in at least one of a delivery source cell and a delivery destination cell on the basis of the record by the first detection recording processing, travel distance calculation processing for calculating a travel distance of the medium delivery means required for delivery of the recording medium for each storage point candidate cell searched in the storage point candidate searching processing on the basis of a position of a searched storage point candidate cell, a position of a delivery source, a position of a delivery destination and a current standby position of the medium delivery means, and medium delivery control processing for controlling the medium delivery means so that the recording medium is stored in the storage point candidate cell, the travel distance to which is the shortest, the travel distance being calculated in the travel distance calculation processing.

Effect Of The Invention

According to the present invention, it becomes possible to avoid wear of a means related to delivery of a recording medium, and to extend the life thereof.

BRIEF DESCRIPTIONS OF THE DRAWINGS

Figure 2:
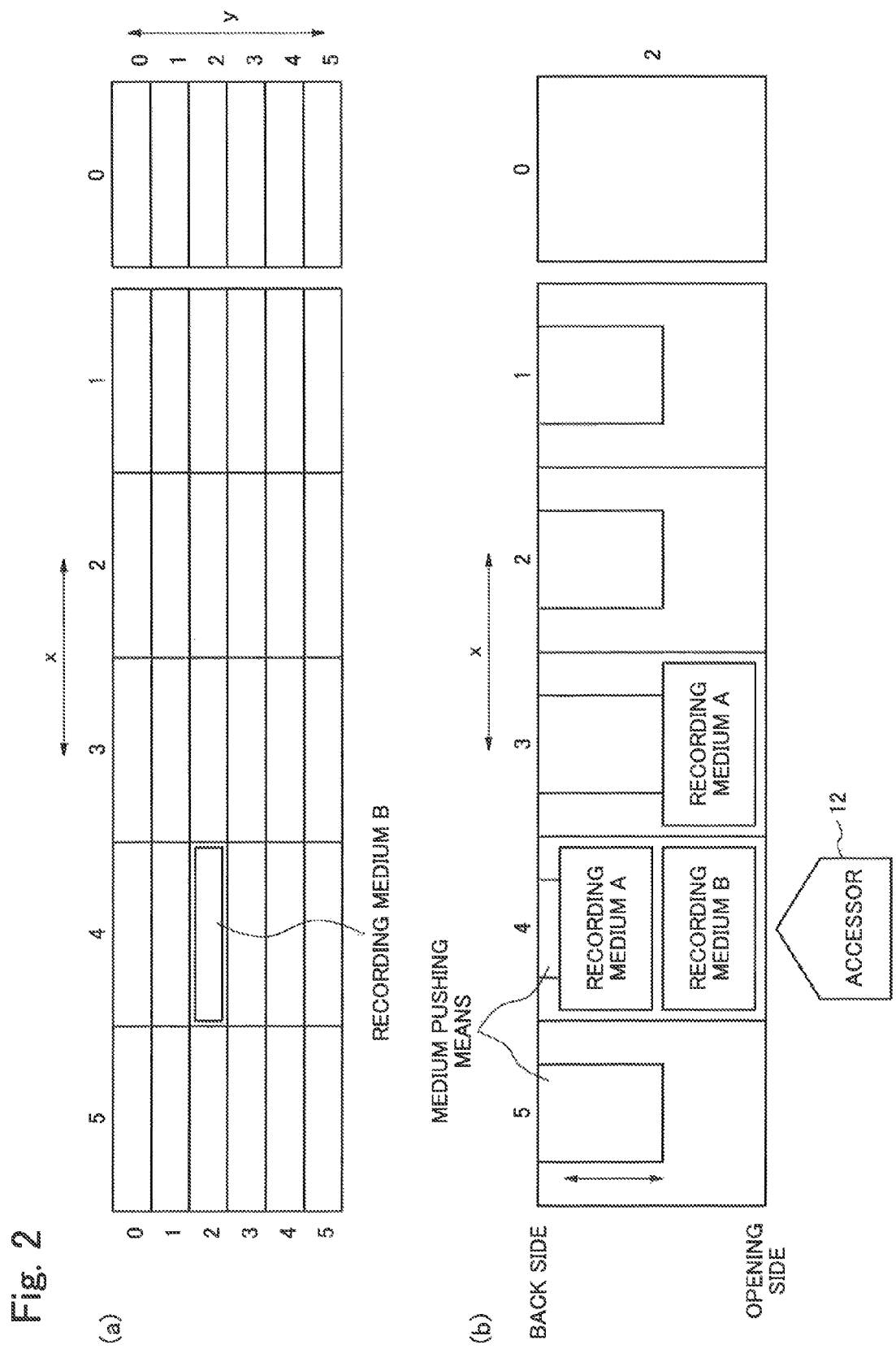
Figure 3:
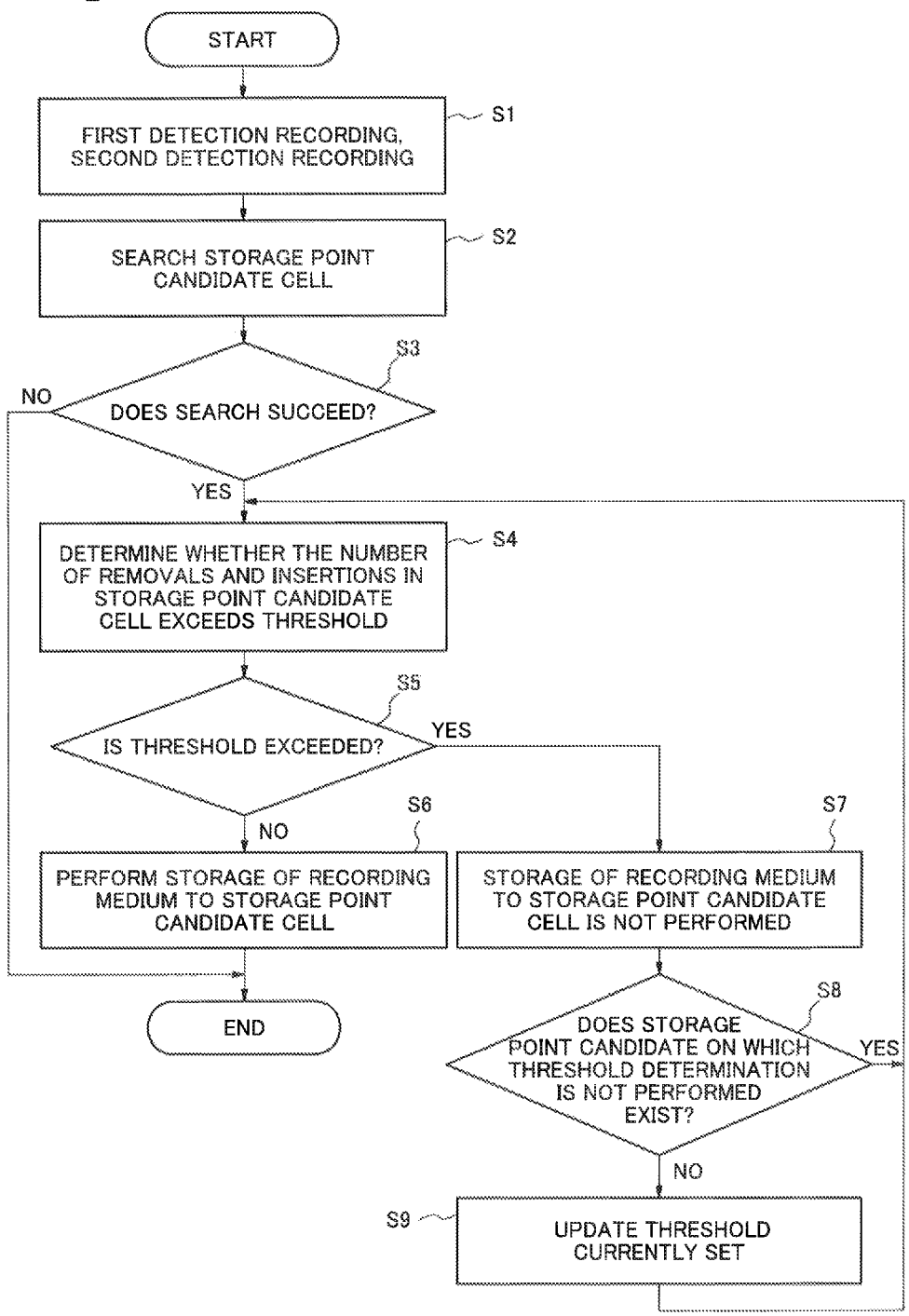
Figure 4:
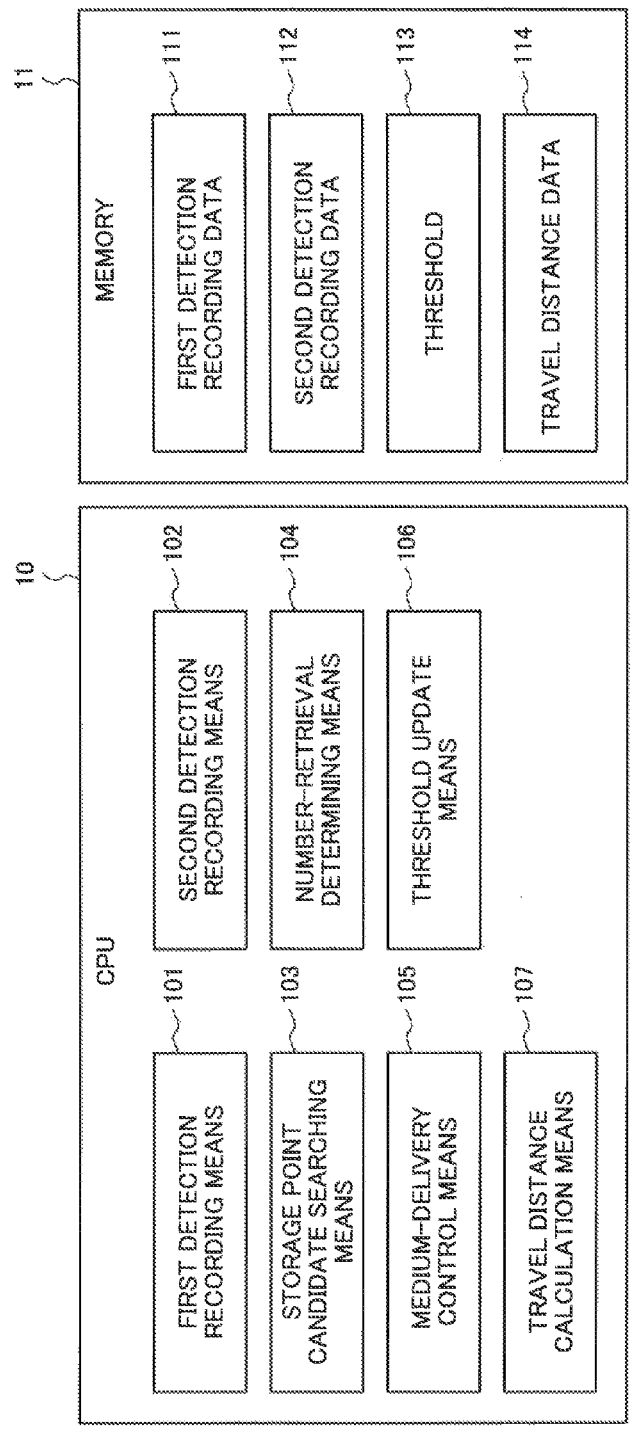
Figure 5:
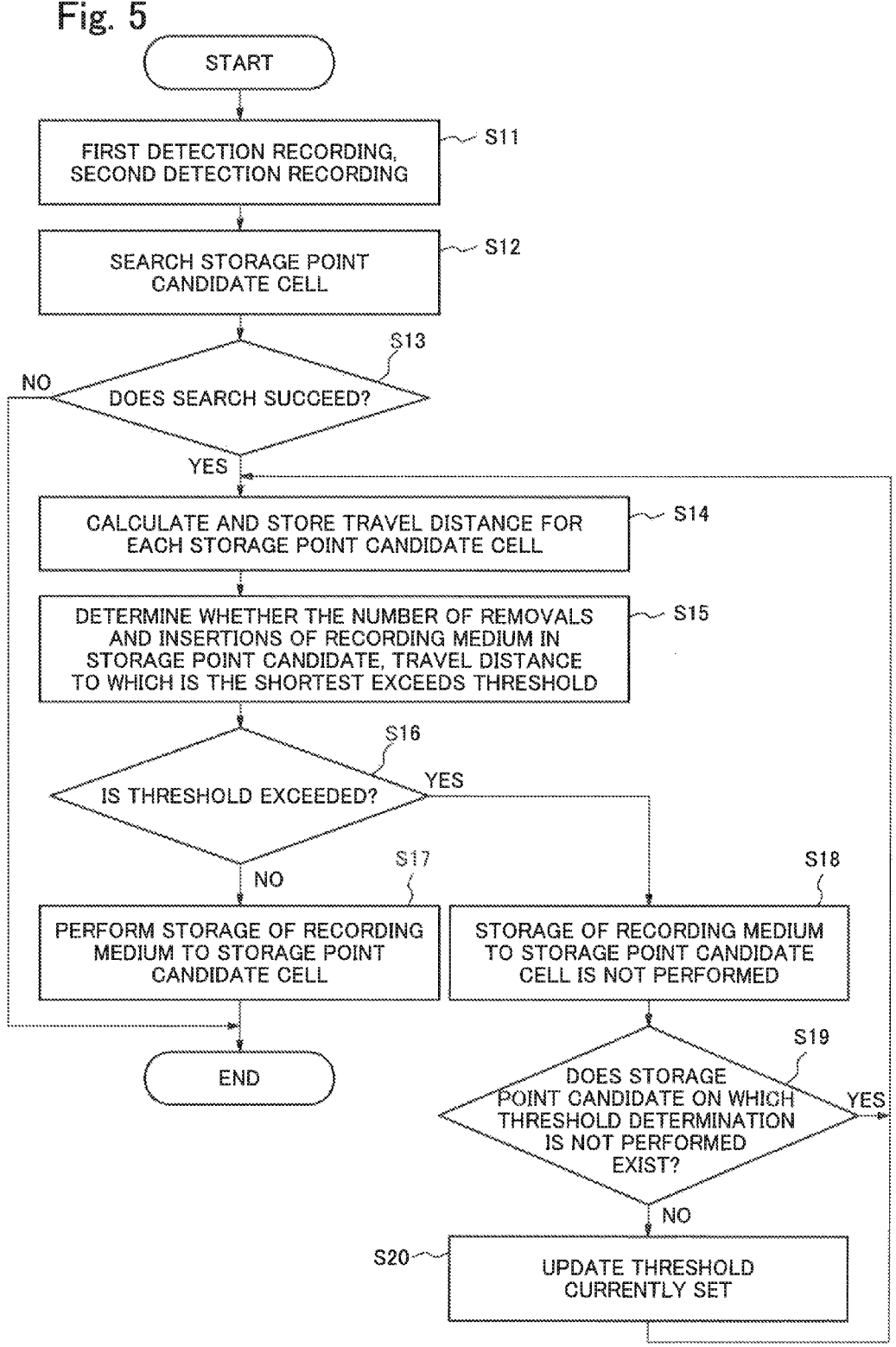
Figure 6:
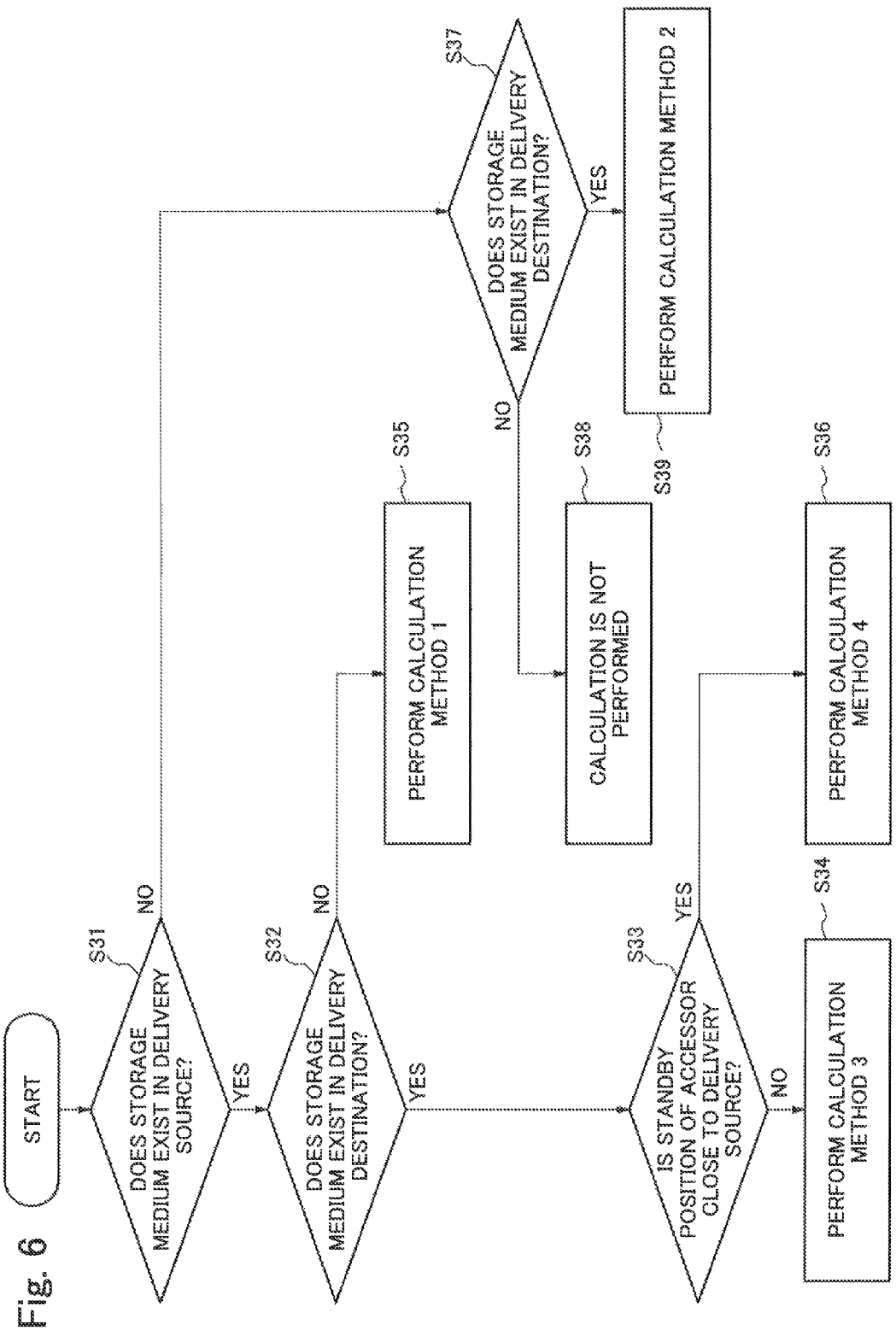
Figure 7:
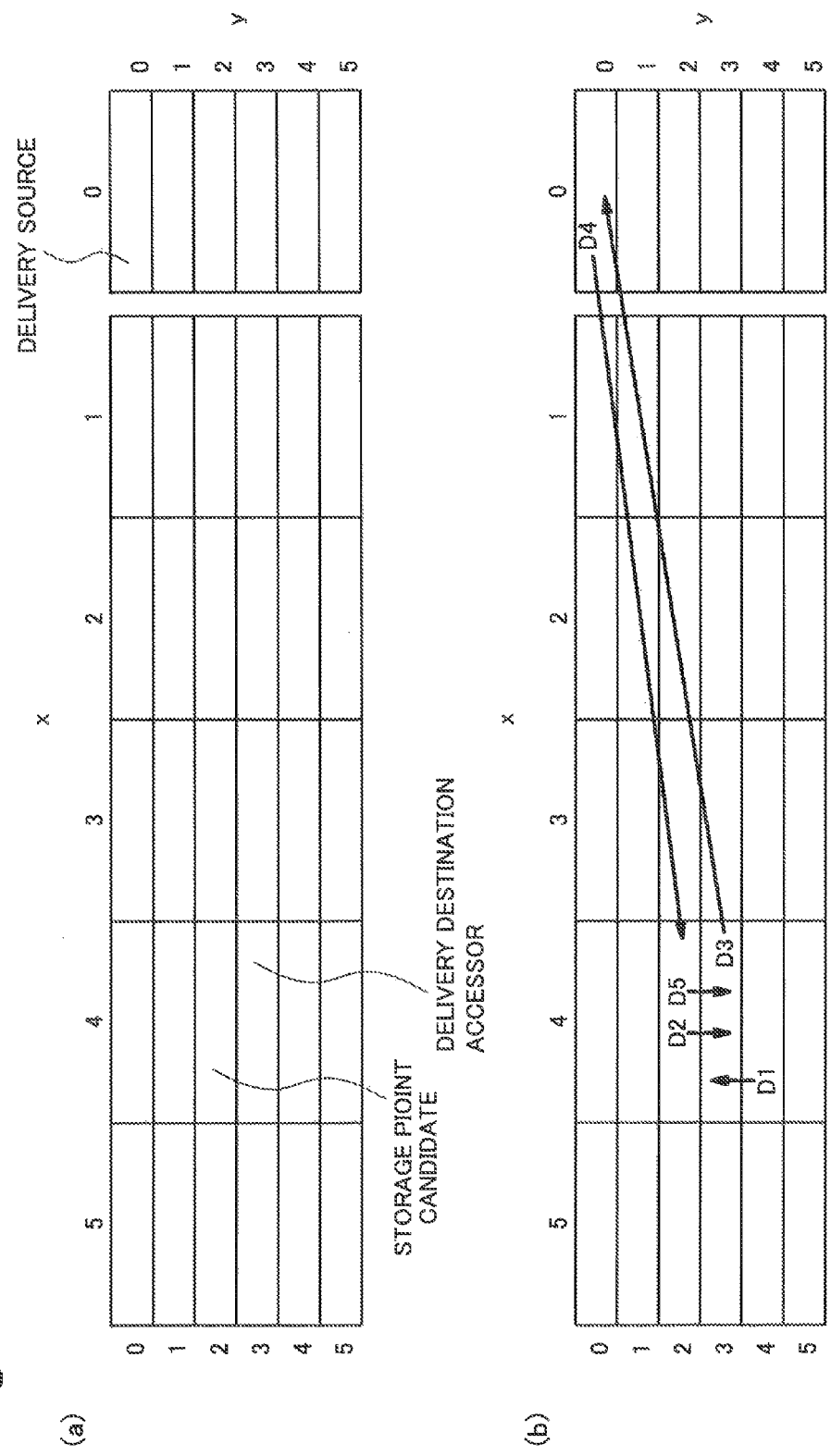
Figure 8:
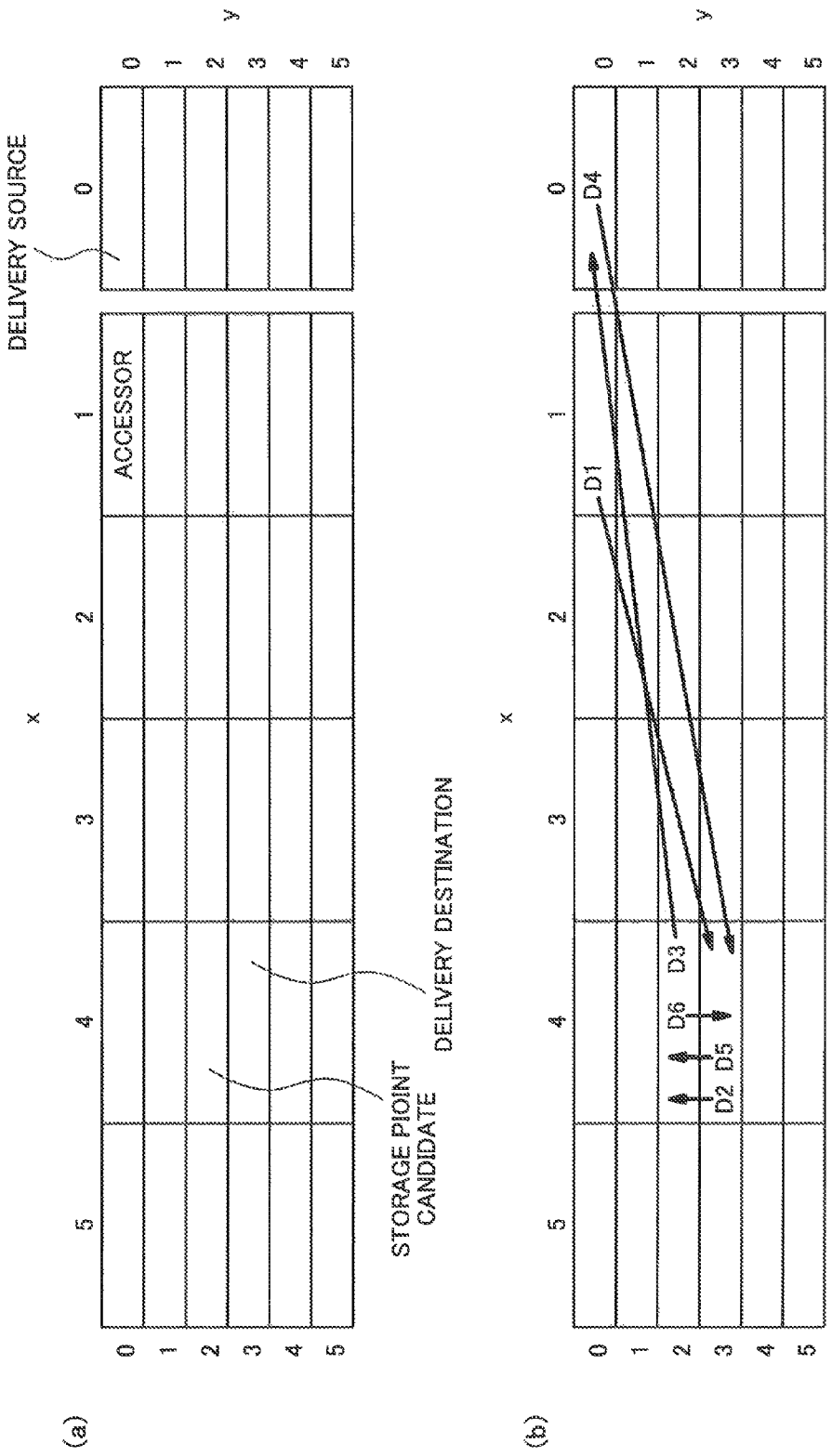
Figure 9:
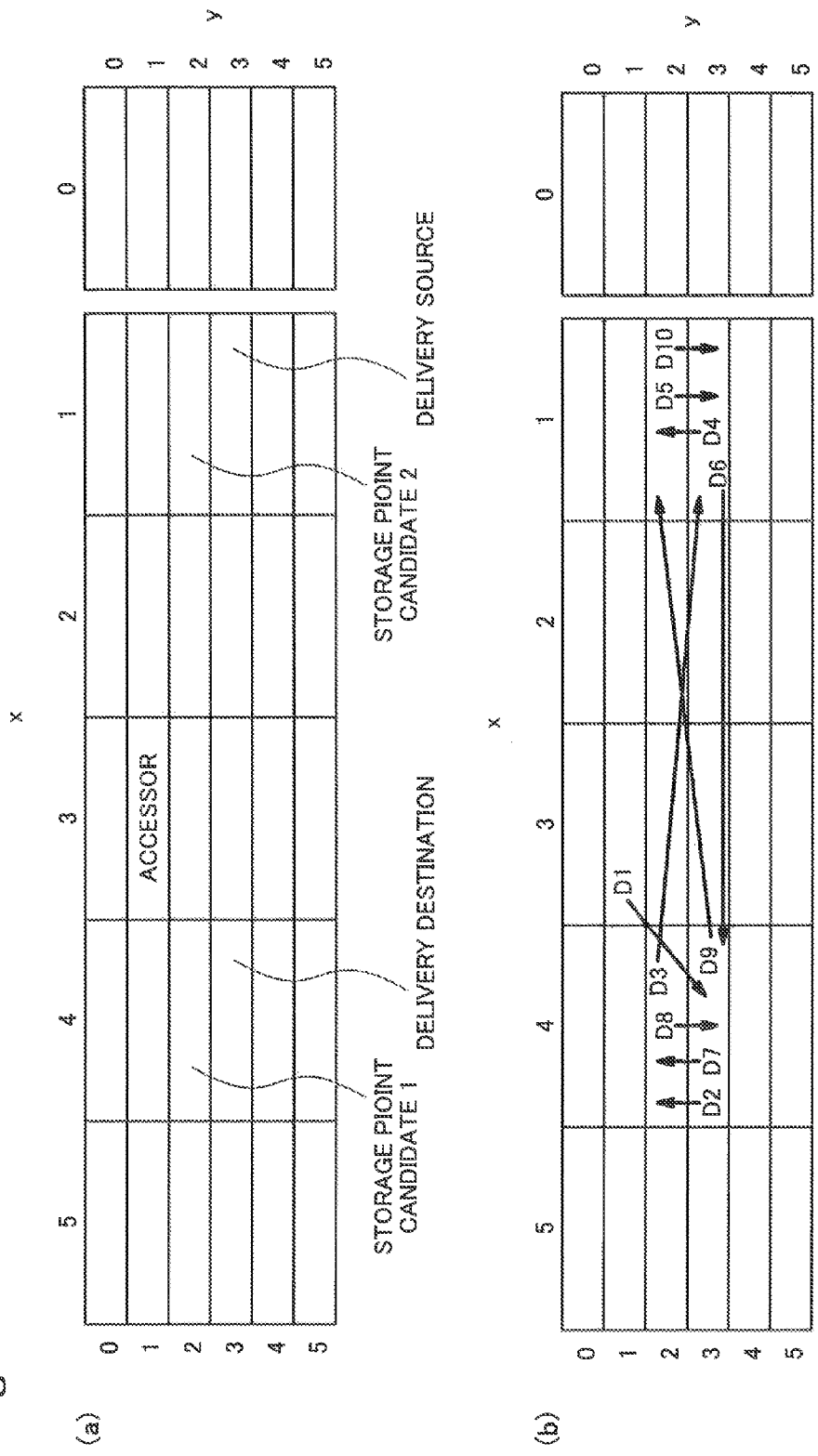
Figure 10:
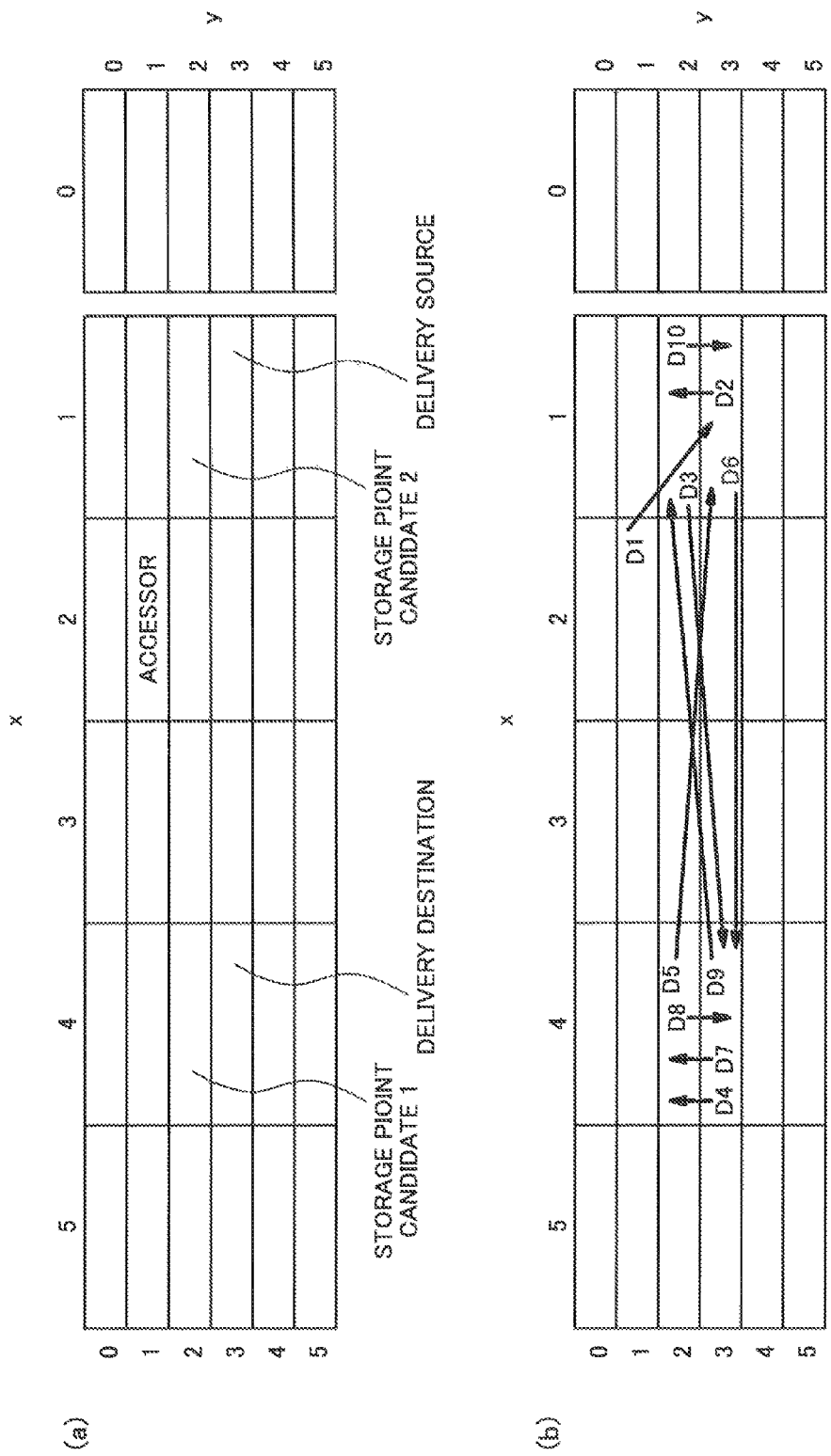
Figure 11:
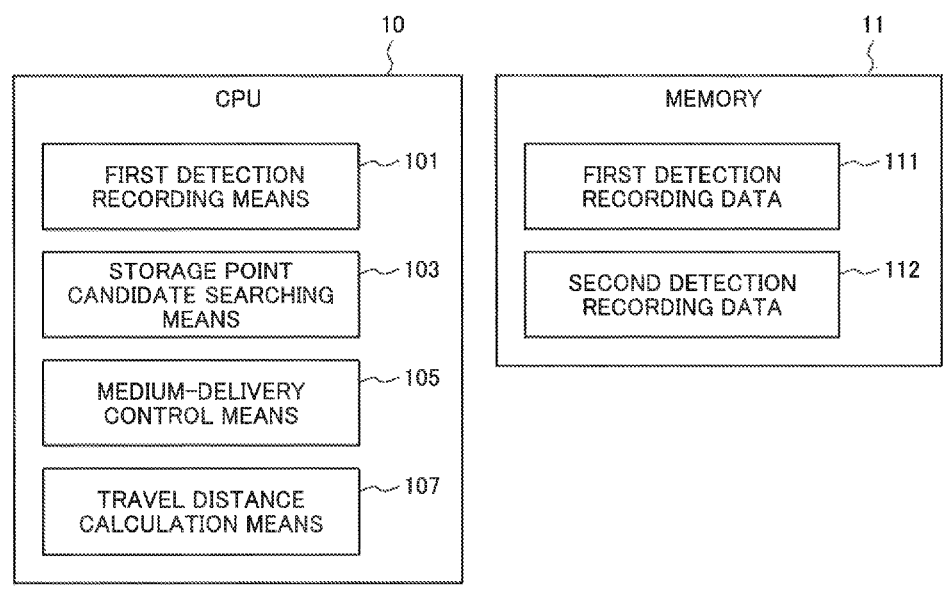
Figure 12:
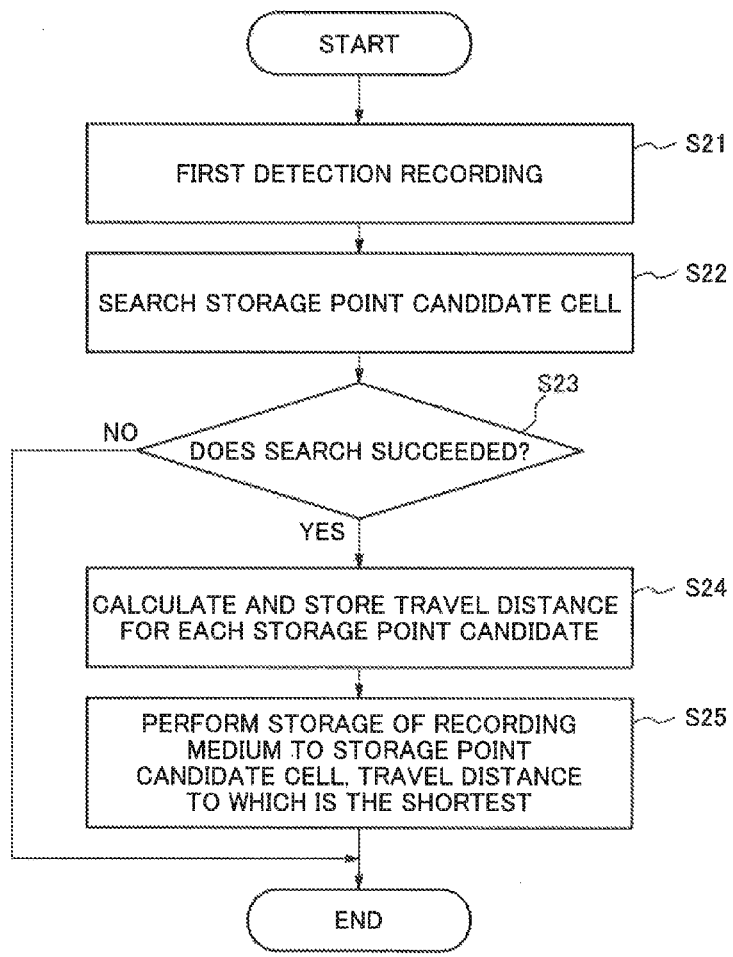

FIG. 1 is a block diagram illustrating an example of a whole configuration of a library device related to an exemplary embodiment of the present invention (first exemplary embodiment), FIG. 2 is a diagram illustrating a configuration of a magazine of a deep cell system loaded in a library device related to an exemplary embodiment of the present invention, FIG. 3 is a flowchart illustrating an example of an operation of a library device related to an exemplary embodiment of the present invention (first exemplary embodiment), FIG. 4 is a block diagram illustrating an example of a main part of a configuration of a library device related to an exemplary embodiment of the present invention (second exemplary embodiment), FIG. 5 is a flowchart illustrating an example of an operation of a library device related to an exemplary embodiment of the present invention (second exemplary embodiment), FIG. 6 is a flowchart illustrating an example of an operation of a travel distance calculation means of a library device related to an exemplary embodiment of the present invention, FIG. 7 is a diagram explaining a specific example of a calculation method 1 of a travel distance calculation means of a library device related to an exemplary embodiment of the present invention, FIG. 8 is a diagram explaining a specific example of a calculation method 2 of a travel distance calculation means of a library device related to an exemplary embodiment of the present invention, FIG. 9 is a diagram explaining a specific example of a calculation method 3 of a travel distance calculation means of a library device related to an exemplary embodiment of the present invention, FIG. 10 is a diagram explaining a specific example of a calculation method 4 of a travel distance calculation means of a library device related to an exemplary embodiment of the present invention, FIG. 11 is a block diagram illustrating an example of a whole configuration of a library device related to an exemplary embodiment of the present invention (third exemplary embodiment), and FIG. 12 is a flowchart illustrating an example of an operation of a library device related to an exemplary embodiment of the present invention (third exemplary embodiment).

ASPECT FOR CARRYING OUT THE INVENTION

A configuration for carrying out the present invention (exemplary embodiment) is described below in detail with reference to drawings. In descriptions below, a library device is described as one exemplary embodiment of a medium delivery control apparatus of the present invention.

[First Exemplary Embodiment]

A configuration of a library device of the exemplary embodiment is described using FIG. 1. As shown in FIG. 1, a library device 1 of the exemplary embodiment includes a CPU (Central Processing Unit), memory 11, an accessor 12, a magazine 14, and a drive 13. The CPU 10, the memory 11, the accessor 12, the magazine 14 and the drive 13 are connected to each other through a data bus. The library device 1 of the exemplary embodiment connects to a higher-level device 2. The higher-level device 2 is, for example, an information processing device like a PC (Personal Computer) and a server.

The library device 1 of the exemplary embodiment corresponds to a magazine of a deep cell system. The magazine (an example of a medium storing means) 14 includes a plurality of deep cells capable of consecutively housing a plurality of recording media (e.g. data cartridge, like tape, disc) in a depth direction from an opening of a cell (slot). The magazine 14 is detachable with respect to the library device 1. A detailed configuration of the magazine 14 and details of housing of the recording medium in the deep sell is described below using FIG. 2.

The accessor (an example of a medium delivery means) 12 is a mechanism (robot) which performs removal, insertion, and delivery of the recording medium with respect to the magazine 14 and the drive 13. In the accessor 12, each operation above is controlled based on a control signal from the CPU 10. The accessor 12 operates in accordance with the magazine of the deep cell system. Descriptions on the operation are omitted since a conventional method can be applied to the operation.

The drive (an example of a recording reproduction means) 13 enables the recording medium delivered by the accessor 12 to be read (reproduction) and written (recording). Which reading or writing is performed depends on the control signal from the CPU 10 instructed by the higher-level device 2. The drive 13 includes a plurality of slots for housing the delivered recording medium. In this specification, "slot" of the drive 13 is described as "cell", just like the magazine 14.

The CPU 10 controls whole operations of the library device 1 by controlling the memory 11, the accessor 12, the drive 13, and the magazine 14 according to instructions from the higher-level device. A control program for performing the control is stored in the memory 11, and the CPU 10 reads the control program from the memory 11 and is executed thereby. FIG. 1 only shows a means related to control of delivery of the recording medium. For example, a recording reproduction control means, is not shown, which transmits the control signal for controlling the drive 13 so that either reading of the recording medium or writing thereof is performed according to the instructions from the higher-level device 2.

The CPU 10 includes, as a means related to control of delivery of the recording medium, a first detection recording means 101, a second detection recording means 102, a storage point candidate searching means 103, a number-retrieval determining means 104, a medium-delivery control means 105, and a threshold update means 106.

The first detection recording means 101 detects whether or not a recording medium is housed for each deep cell arranged in the magazine 14 and which the recording medium is, if it is housed, and stores them in the memory 11. The first detection recording means 101 detects the position in which the accessor 12 currently stands by (standby position) and stores it in the memory 11. The records are stored in the memory 11 as the first detection recording data 111. Thereby, the CPU 10 is capable of recognizing which a cell houses a recording medium, which the recording medium is, which a vacant cell is (which a cell without a recording medium is), and where the accessor 12 stands by (in front of which cell). The first detection recording means 101 performs detection and recording when a main power source of the library device 1 is turned on, when loading the magazine 14 (insertion into library device) is performed, when travel of the accessor 12 is completed, and the like.

The second detection recording means 102 detects the number of removals and insertions (frequency of removals and insertions) of a recording medium for each deep cell arranged in the magazine 14, and stores it in the memory 11. The memory 11 stores the records as a second detection recording data 112. Thereby, the CPU 10 can recognize in which cell the recording medium is removed or inserted and how many times the recording medium is removed or inserted. The second detection recording means 102 performs detection and recording every time the recording medium is removed and inserted in the loaded magazine 14.

The storage point candidate searching means 103 searches a cell capable of housing at least one recording medium with reference to the record of the first detection recording means 101 (first detection recording data 111). In the exemplary embodiment, the searching is performed, for example, with respect to all the deep cells in the magazine 14 and all the cells in the drive 13. The searching may be performed with respect to either all the deep cells in the magazine 14 or all the cells in the drive 13. The searched cell is used as a storage point candidate cell. The storage point candidate cell temporarily houses (stores) a recording medium which is housed in at least one of a delivery source cell and a delivery destination cell. This searching starts near the deep cell (delivery source, delivery destination) housing the recording medium to be stored, in a predetermined order. Details of the searching are described below.

The number-retrieval determining means 104 retrieves the number of removals and insertions in the storage point candidate cell searched by the storage point candidate searching means 103 and determines whether or not the retrieved number of removals and insertions exceeds a predetermined threshold 113, with reference to the record of the second detection recording means 102 (second detection recording data 112). The threshold 113 is housed in the memory 11 in advance. If the retrieved number of removals and insertions exceeds the predetermined threshold 113, the number-retrieval determining means 104 temporarily stores the number of removals and insertions in the memory 11 (deletes it after storage).

The medium-delivery control means 105 controls operations of the accessor 12 based on the result of the determination of the number-retrieval determining means 104. If the number of removals and insertions does not exceed the predetermined threshold 113, the medium-delivery control means 105 transmits a control signal to the accessor 12 so that the recording medium is stored into the searched storage point candidate cell. If the number of removals and insertions exceeds the predetermined threshold 113, the medium-delivery control means 105 transmits the control signal to the accessor 12 so that the recording medium is not stored into the searched storage point candidate cell.

The threshold update means 106 updates the threshold 113 in accordance with an instruction from the higher-level device 2 or when a predetermined condition is satisfied. For example, when the storage point candidate searching means 103 searches whether or not a deep cell can be the storage point candidate cell with respect to all the deep cells arranged in the magazine 14 and when the number-retrieval determining means 104 determines that all the number of removals and insertions in the storage point candidate cells exceed the threshold 113, the threshold update means 106 performs update, for example, by adding a predetermined value to the threshold 113. When the threshold 113 is updated, the number-retrieval determining means 104 performs determination on the basis of the updated threshold 113.

The memory 11 houses various types of information used in the library device 1. FIG. 1 illustrates only information related to control of delivery of the recording medium. For example, the control program which is executed through the CPU 10 and controls the whole of the library device 1 is not shown. The memory 11 includes not only a non-volatile memory for housing the information related to control of delivery of the recording medium, but a ROM (Read Only Memory) for housing the control program and a RAM (Random Access Memory) used as a working area of the CPU 10.

The memory 11 includes the first detection recording data 111, the second detection recording information 112 and the threshold 113, as the information related to control of delivery of the recording medium. The memory 11 stores information indicating the position of the searched storage point candidate cell and information indicating the number of times the recording medium is removed and inserted in the searched storage point candidate cell (details are described below).

The first detection recording data 111 is detected by the first detection recording means 101 and is stored in the memory 11. The contents thereof indicates whether or not the recording medium is housed and which the recording medium is if it is housed, for each deep cell arranged in the magazine 14, and where a current standby position of the accessor 12 is.

The second detection recording data 112 is detected by the second detection recording means 112 and is stored in the memory 11. The contents thereof indicate the number of times the recording medium is removed and inserted (the number of removals and insertions) for each deep cell arranged in the magazine 14. A default value of the second detection recording data 112 is e.g. zero.

The threshold 113 is a criterion of determination with which the number-retrieval determining means 104 compares the number of removals and insertions in the storage point candidate cell searched by the storage point candidate searching means 103. A default value of the threshold 113 is housed in the memory 11 in advance, as a factory default value of the library device 1. After that, when addition is carried out by the threshold update means 106, the threshold 113 is updated (changed).

The number-retrieval determining means 104 may use two different values as the threshold 113. That is because disadvantage occurs if one threshold is used, since the deep cell of the drive 13 differs from the cell of the magazine 14 in the number of removals and insertions. Therefore, as the threshold 113, two different thresholds are prepared in advance. The two different thresholds include a first threshold which is used when the searched storage point candidate cell is a cell of the magazine 14 and a second threshold which is used when the searched storage point candidate cell is a cell of the drive 13 (second threshold>first threshold). The number-retrieval determining means 104 chooses the first threshold or the second threshold depending on which the storage point candidate cell searched by the storage point candidate searching means 103 is the cell of the magazine 14 or the cell of the drive 13, respectively, and performs determination using the chosen threshold. Since the number-retrieval determining means 104 uses one of the different thresholds used for determination depending on the types of the storage point candidate cells, the problem, which is caused by difference of the number of removals and insertions between the deep cell of the drive 13 and the cell of the magazine 14, is resolved.

If one threshold is used and the searched storage point candidate cell is the cell of the drive 13, the number-retrieval determining means 104 may multiply the number of removals and insertions in the storage point candidate cell by a predetermined coefficient before the threshold is determined, and determine whether or not the product value exceeds the threshold. Thereby, the problem, which is caused by difference of the number of removals and insertions between the deep cell of the drive 13 and the cell of the magazine 14, is resolved.

With reference to FIG. 2, a detailed configuration of the magazine 14 and details of housing of a recording medium in the deep cell are described. FIG. 2 (a) shows diagrams illustrating side views of the magazine 14 and the drive 13, FIG. 2 (b) shows diagrams illustrating cross sectional plan views of the magazine 14 and the drive 13.

As shown in FIG. 2 (a), the magazine 14 includes a plurality of deep cells which are arranged in an x-axis direction (horizontal direction) and in a y-axis direction (vertical direction). In FIG. 2 (a), the magazine 14 includes deep cells of five columns (1-5) in the x-axis direction and deep cells of six rows (0-5) in the y-axis direction. In this specification, a line of the y-axis direction is a "column", and a line of the x-axis direction is a "row". In FIG. 2 (a), for example, a recording medium B is housed in the deep cell located at the position of (x, y)=(4, 2). The specification describes x-y coordinate, e.g. "(4, 2)" in order to specify a position of the deep cell. On the right side of FIG. 2 (a), the cells of the drive 13 are shown. The drive 13 includes cells of one column (0) in the x-axis direction and six rows (0-5) in the y-axis direction. The cell of the drive 13 is not necessarily the deep cell.

As shown in FIG. 2 (b), a medium pushing means is arranged on the back side in each deep cell. The medium pushing means pushes the recording medium housed on the back side in the cell to the opening side therein to facilitate a removal operation of the recording medium by the accessor 12. The medium pushing means is configured using, for example, a resilient member (e.g. spring). In the example shown in FIG. 2 (b), in the deep cell (5, 2), in which the recording medium is not housed, the medium pushing means is extended to the center part of the cell. In such condition, if the recording medium A is housed first, followed by the recording medium B, the medium pushing means is pushed by the recording medium A to shrink to the back side of the cell. The medium pushing means becomes the state shown in the deep cell (4, 2). Since the recording medium B is removed (stored) when the recording medium A is removed, the medium pushing means pushes the recording medium A to the opening side to the cell. The medium pushing means becomes the state shown in the deep cell (3, 2). As described above, since the recording medium A housed on the back side moves to the opening side, removal thereof by the accessor 12 becomes easy.

Operations of the library device of the exemplary embodiment are described using the flowchart in FIG. 3. FIG. 2 described above is used as an example.

After the magazine 14 is loaded with the library device 1, detection and recording is performed by the first detection recording means 101 and the second detection recording means 102 (S1). Suppose that the recording media A and B is housed in the deep cell (4, 2) as shown in FIG. 2 (a) and FIG. 2 (b). The deep cell (4, 2) is described as "delivery source deep cell", or "delivery source".

Here, the CPU 10 receives, for example, an instruction "reproduction (read) of the recording medium A" from the higher-level device 2. Thereby, following operations are conducted, that is, an operation of searching the storage point candidate cell for storing the recording medium B, an operation of delivering the recording medium B to the searched storage point candidate cell, and an operation of delivering the recording medium A to the drive 13. For example, the recording medium A is delivered to the cell (0, 0) in the drive 13. The cell (0, 0) is described as a "delivery destination cell" or "delivery destination".

The storage point candidate searching means 103 searches a cell which can becomes a storage point candidate, that is, a cell capable of housing at least one recording medium, near the delivery source deep cell (4, 2), with reference to the first detection recording data 111 in the memory 11 (S2).

An example of a searching method of the storage point candidate searching means 103 is described. The method described below is an example and is not limited thereto. If the y-coordinate of the delivery source is equal to or greater than the y-coordinate of the delivery destination, the storage point candidate searching means 103 starts searching from the top row to the bottom in the column which the delivery source is included. When the bottom row in the column is searched, the column to be searched is shifted toward the delivery destination by one column, and searching from the top row to the bottom row in the adjacent column is performed. In the example of FIG. 2 (a), since the delivery source is (4, 2) and the delivery destination is (0, 0), the storage point candidate searching means 103 starts searching from the deep cell (4, 0) which is the top row of the column 4. After that, the storage point candidate searching means 103 searches in an order of (4, 1), (4, 3), (4, 4), (4, 5), moves by one column toward the cell (0, 0) which is the delivery destination, and starts searching from the top row (3, 0) in the column 3. The storage point candidate searching means 103 searches columns 4, 3, 2, 1, 0, and 5, in that order. On the other hand, if the y-coordinate of the delivery source is smaller than the y-coordinate of the delivery destination, the storage point candidate searching means 103 starts searching from the bottom row to the top row in the column which the delivery source is included. When the top row in the column is searched, the column to be searched is shifted toward the delivery destination by one column, and searching from the bottom row to the top row in the adjacent column is performed again.

The searching method above described is further separated into two methods. In one method, searching starts in the above order, the searching stops when the storage point candidate cell is found, and the searching restarts from the cell next to the searched cell when a threshold is exceeded in determination at S4 described below. In another method, searching starts in the above order, every time the storage point candidate cell is found, a position (coordinate) of the cell is stored in the memory 11, or the like, and the searching is performed at once with respect to all the cells. Though the above two methods are available, an example of the latter searching method is described below.

If storage point candidate searching (searching whether to be the storage point candidate cell) fails by using the searching method of the storage point candidate searching means 103 described above (S3/NO), that is, if any cell which can be the storage point candidate cell is not found in all the cells of the magazine 14 and the drive 13, the library device 1 ends a series of processes. In this case, recording medium storage is not performed. If storage point candidate searching succeeds (S3/YES), S4 is performed. As one example, suppose that the deep cell (4, 4) and the deep cell (3, 0) are found as the storage point candidate cell. The positions (coordinate) of the searched storage point candidate cells are stored in the memory 11 by the storage point candidate searching means 103 during searching. The stored positions are arranged, for example, in a searching order.

The number-retrieval determining means 104 initially refers to the second detection recording data 112 in the memory 11 and retrieves the number of times a recording medium is removed and inserted at the deep cell (4, 4) (storage point candidate which is first searched). Next, the number-retrieval determining means 104 compares the threshold 113 in the memory 11 with the retrieved number of removals and insertions and determines whether or not the number of removals and insertions exceeds the threshold 113 (S4).

In the determination of the number-retrieval determining means 104, if the number of removals and insertions in the storage point candidate cell exceeds the threshold 113 (S5/YES), recording medium storage into the storage point candidate cell is not performed (S7). Suppose here that the number of removals and insertions in the storage point candidate deep cell (4, 4) exceeds the threshold 113. The medium-delivery control means 105 transmits the control signal to the accessor 12 so that the recording medium B is not stored from the delivery source deep cell (4, 2) to the storage point candidate deep cell (4, 4). The accessor 12 is controlled by the control signal. If the number of removals and insertions exceeds the threshold 113 (S5/YES), the number-retrieval determining means 104 temporarily stores the number of removals and insertions in the storage point candidate cell in the memory 11. The record is used when the threshold is updated (S9).

The number-retrieval determining means 104 determines whether or not the storage point candidate on which the threshold determination in S4 is not performed exists, that is, whether or not the storage point candidate cell on which the threshold determination in S4 is not performed exists in the searched storage point candidate cell (S8). This determination is performed, for example, by the number-retrieval determining means 104. The number-retrieval determining means 104 refers to the memory 11 and searches the storage point candidate cell on which the threshold determination is not performed. Since the threshold determination on the deep cell (3, 0) is not performed, the number-retrieval determining means 104 determines that the storage point candidate on which the threshold determination in S4 is not performed exists (S8/YES).

The number-retrieval determining means 104 initially refers to the second detection recording data 112 in the memory 11 and retrieves the number of removals and insertions of the recording medium in the deep cell (3, 0) (storage point candidate which is secondarily searched). Next, the number-retrieval determining means 104 compares the threshold 113 in the memory 11 with the retrieved number of removals and insertions and determines whether or not the number of removals and insertions exceeds the threshold 113 (S4). Suppose, for example, that the number of removals and insertions in the storage point candidate deep cell (3, 0) exceeds the threshold 113 (S5/YES). The medium-delivery control means 105 transmits the control signal to the accessor 12 so that the recording medium B is not stored from the delivery source deep cell (4, 2) to the storage point candidate deep cell (3, 1) (S7). The accessor 12 is controlled by the control signal. Since the number of removals and insertions exceeds the threshold 113 (S5/YES), the number-retrieval determining means 104 temporarily stores the number of removals and insertions in the storage point candidate deep cell (3, 1) in the memory 11.

The number-retrieval determining means 104 refers to the memory 11 and searches the storage point candidate cell on which the threshold determination is not performed (S8). Since the threshold determination is performed on all of the searched storage point candidate cells, the number-retrieval determining means 104 determines that the storage point candidate on which the threshold determination in S4 is not performed does not exist (S8/NO).

The threshold update means 106 adds a predetermined value to the threshold 113 currently stored in the memory 11 to update the threshold 113 (S9).

After that, the number-retrieval determining means 104 determines whether or not the number of removals and insertions in the storage point candidate cell temporarily stored in the memory 11 exceeds the updated threshold (S4). Here, the number-retrieval determining means 104 determines whether or not the number of removals and insertions in the deep cell (4, 4) temporarily stored exceeds the updated threshold 113 (S4). As a result, it is determined that the number of removals and insertions in the deep cell (4, 4) temporarily stored exceeds the updated threshold 113 (S5/YES).

In this case (S5/YES), as descriptions above, storage of the recording medium is not performed (S6). The number-retrieval determining means 104 refers to the memory 11 again and searches the storage point candidate cell on which the threshold determination using the updated threshold 113 is not performed. Since the threshold determination on the deep cell (3, 0) using the updated threshold 113 is not performed, the number-retrieval determining means 104 determines that the storage point candidate on which the threshold determination is not performed exists (S8/YES).

The number-retrieval determining means 104 determines again whether or not the number of removals and insertions in the deep cell (3, 0) temporarily stored exceeds the updated threshold 113 (S4). Suppose, for example, that the number of removals and insertions in the deep cell (3, 0) temporarily stored does not exceed the updated threshold 113 (S5/NO).

As a result of the determination by the number-retrieval determining means 104, if the number of removals and insertions in the storage point candidate cell does not exceed the threshold 113 (S5/NO), the medium-delivery control means 105 transmits the control signal to the accessor 12 so that the recording medium B is stored from the delivery source deep cell (4, 2) to the storage point candidate deep cell (3, 0) (S6). The control signal includes control contents that after storage of the recording medium B, the recording medium A is delivered from the delivery source deep cell (4, 2) to the delivery destination cell (0, 0), and after delivery of the recording medium A, the recording medium B stored in the deep cell (3, 0) is delivered to the delivery source deep cell (4, 2) and housed therein again. According to the control signal, the accessor 12 performs removal, insertion and delivery of the recording media A and B with respect to each cell (delivery source, delivery destination and storage point candidate).

As described above, in the exemplary embodiment, the library device 1 works so that the recording medium is stored in the cell in which a predetermined threshold is not proceeded, and prevents the medium pushing means of the specific cell in the magazine 14 from wearing due to the large number of removals and insertions. The library device 1 can avoid wear of a medium storage means (magazine 14) as a means related to delivery of the recording medium, and can extend the length of life.

[Second Exemplary Embodiment]

A configuration of the library device of the exemplary embodiment is described using FIG. 4. FIG. 4 illustrates configurations of the CPU 10 and memory 11. FIG. 4 omits the other configuration which is similar to the configuration of the first exemplary embodiment. The library device 1 of the exemplary embodiment includes the CPU 10, the memory 11, the accessor 12, the magazine 14, and the drive 13 which are connected to a data bus which is not shown. The library device 1 of the exemplary embodiment connects to the higher-level device 2.

As shown in FIG. 4, the CPU 10 and the memory 11 of the exemplary embodiment further include a travel distance calculation means 107 and a travel distance data 114, respectively, compared with the configuration shown in FIG. 1. The means and the data other than the travel distance calculation means 107 and the travel distance data 114 are similar to those of the first exemplary embodiment which are described above. Descriptions thereof, therefore, are omitted.

The travel distance calculation means 107 calculates a distance which the accessor 12 moves (travel distance) when the accessor 12 delivers the recording medium in accordance with an instruction from the higher-level device 2. The calculation is performed based on the position of the storage point candidate cell searched by the storage point candidate searching means 103, the position of the delivery source, the position of the delivery destination, and the position at which the accessor 12 is currently located (standby position). The travel distance calculation means 107 calculates the travel distance for each searched storage point candidate cell, and stores the calculation results in the memory 11. Thereby, the travel distance for each searched storage point candidate cell calculated by the travel distance calculation means 107 is stored in the memory 11 as the travel distance data 114.

Operations of the library device of the exemplary embodiment are described using a flowchart of FIG. 5. As an example, FIG. 2 is employed.

After the magazine 14 is loaded in the library device 1, the first detection recording means 101 and the second detection recording means 102 perform detection and recording (S11). As shown in FIG. 2 (a) and FIG. 2 (b), the recording media A and B are housed in the deep cell (4, 2), for example. The deep cell (4, 2) is the delivery source. Further, as an example, the accessor 12 stays in front of the deep cell (4, 3). The deep cell (4, 3) is the standby position.

Suppose here that the CPU 10 receives, for example, an instruction "reproduction of the recording medium A (read)" from the higher-level device 2. The recording medium A is delivered to the cell (0, 0) of the drive 13 which is the delivery destination.

The storage point candidate searching means 103 searches a cell which can be the storage point candidate near the delivery source deep cell (4, 2), that is, a cell which can house at least one recording medium, with reference to the first detection recording data 111 in the memory 11 (S12). Details of the searching method are omitted since they are described in the first exemplary embodiment. In the descriptions below, for example, searching starts from the top row of the column including the delivery source to the bottom row thereof while shifting the column, every time the searching candidate cell is found, the position (coordinate) of the cell is stored in the memory 11 or the like, and all the cells are searched at once.

If storage point candidate searching by the storage point candidate searching means 103 (S13/NO) fails, that is, if a cell which can be the storage point candidate cell is not found in all the cells of the magazine 14 and the drive 13, the library device 1 ends a series of processes. In this case, recording medium storage is not performed. If the storage point candidate searching succeeds (S13/YES), S14 is performed. As one example, suppose that a deep cell (4, 4) and a deep cell (3, 0) are found as the storage point candidate cell. During searching, the positions (coordinate) of the storage point candidate cells are stored in the memory 11 in a searching order by the storage point candidate searching means 103.

The travel distance calculation means 107 calculates a travel distance for each storage point candidate cell searched by the storage point candidate searching means 103 based on the delivery source, the delivery destination, the standby position, and each position (coordinate) of the storage point candidate (S14). Here, the travel distance calculation means 107 calculates the travel distance with respect to the storage point candidate cell (3, 0) based on the delivery source (4, 2), the delivery destination (0, 0), the standby position (4, 3) and the storage point candidate (3, 0). A specific example of the calculation method (formula) for the travel distance is described below. The travel distance calculation means 107 stores each calculated travel distance in the memory 11 as the travel distance data 114. In the travel distance data 114, the position of the storage point candidate cell is associated with the calculated travel distance.

The number-retrieval determining means 104 refers to the travel distance data 114 in the memory 11 and searches the storage point candidate cell, the travel distance to which is the shortest. Next, the number-retrieval determining means 104 refers to the second detection recording data 112 in the memory 11 and retrieves the number of times the recording medium is removed and inserted in the storage point candidate cell, the travel distance to which is the shortest. The number-retrieval determining means 104 compares the threshold 113 in the memory 11 with the retrieved number of removals and insertions, and determines whether or not the number of removals and insertions exceeds the threshold 113 (S15). As an example, suppose that the storage point candidate cell, the travel distance to which is the shortest is the deep cell (4, 4). The number-retrieval determining means 104 determines whether or not the number of removals and insertions in the deep cell (4, 4) exceeds the threshold 113.

As a result of determination by the number-retrieval determining means 104, if the number of removals and insertions in the storage point candidate cell exceeds the threshold 113 (S16/YES), the recording medium is not stored in the storage point candidate cell (S18). Suppose here that the number of removals and insertions in the deep cell (4, 4) exceeds the threshold 113. The medium-delivery control means 105 transmits the control signal to the accessor 12 so that the recording medium B is not stored from the delivery source deep cell (4, 2) to the storage point candidate cell (4, 4). The accessor 12 is controlled by the control signal. If the number of removals and insertions exceeds the threshold 113 (S16/YES), the number-retrieval determining means 104 temporarily stores the number of removals and insertions in the storage point candidate cell in the memory 11. The record is used when the threshold is updated (S20).

Next, it is determined whether or not the storage point candidate on which the threshold determination of S15 is not performed exists, that is, whether or not a cell on which the threshold determination of S15 is not performed exists in the storage point candidate cells, the travel distances to which are calculated (S19). For example, the number-retrieval determining means 104 performs the determination. The number-retrieval determining means 104 refers to the travel distance data 114 in the memory 11, and searches the storage point candidate cell on which the threshold determination is not performed. Since the threshold determination on the deep cell (3, 0) is not performed here, the number-retrieval determining means 104 determines the storage point candidate, on which the threshold determination is not performed, exists (S19/YES).

The number-retrieval determining means 104 refers to the travel distance data 114 in the memory 11, and searches the storage point candidate cell, the travel distance to which is the shortest, except the storage point candidate cell on which the threshold determination is performed. Since the deep cell (3, 0) only exists here, the cell is searched. Next the number-retrieval determining means 104 refers to the detection recording data 112 in the memory 12 and retrieves the number of removals and insertions of the recording medium in the deep cell (3, 0). Next, the number-retrieval determining means 104 compares the threshold 113 in the memory 11 with the retrieved number of removals and insertions and determines whether or not the number of removals and insertions exceeds the threshold 113 (S15). Suppose here that the number of removals and insertions in the storage point candidate deep cell (3, 0) exceeds the threshold 113 (S16/YES). Therefore, the medium-delivery control means 105 transmits the control signal to the accesoor 12 so that the recording medium B is not stored from the delivery source deep cell (4, 2) to the storage point candidate deep cell (3, 0) (S18). The accessor 12 is controlled by the control signal. Since the number of removals and insertions exceeds the threshold 113 (S16/YES), the number-retrieval determining means 104 temporarily stores the number of removals and insertions in the storage point candidate deep cell (3, 0) in the memory 11.

The number-retrieval determining means 104 refers to the travel distance data 114 in the memory and searches the storage point candidate cell on which the threshold determination is not performed (S19). Since the threshold determination is performed on all the storage point candidate cells here, the number-retrieval determining means 104 determines the storage point candidate on which the threshold determination is not performed does not exists (S19/NO).

The threshold update means 106 adds a predetermined value to the threshold 113 which is currently stored in the memory 11 to update the threshold 113.

After that, the number-retrieval determining means 104 determines whether or not the number of removals and insertions in the storage point candidate cell temporarily stored in the memory 11 exceeds the updated threshold (S15). The number-retrieval determining means 104 here determines whether or not the number of removals and insertions in the deep cell (4, 4) temporarily stored exceeds the updated threshold 113 again (S15). Suppose that the number of removals and insertions in the deep cell (4, 4) temporarily stored exceeds the updated threshold 113, as a result of the determination (S16/YES).

In this case (S16/YES), the recording medium is not stored (S18). The number-retrieval determining means 104 refers to the travel distance data 114 in the memory 11 and searches the storage point candidate cell on which the threshold determination of S15 using the updated threshold 113 is not performed. Since the threshold determination on the deep cell (3, 0) using the updated threshold 113 is not performed here, the number-retrieval determining means 104 determines the storage point candidate on which the threshold determination is not performed exists (S19/YES).

The number-retrieval determining means 104 determines again whether or not the number of removals and insertions in the deep cell (3, 0) temporarily stored exceeds the updated threshold 113 (S15). For example, suppose that the number of removals and insertions in the deep cell (3, 0) temporarily stored does not exceed the updated threshold 113 (S16/NO).

If the number of removals and insertions in the storage point candidate cell does not exceed the threshold 113, as a result of the determination by the number-retrieval determining means 104 (S16/NO), the medium-delivery control means 105 transmits the control signal to the accessor 12 so that the recording medium B is stored from the delivery source deep cell (4, 2) to the storage point candidate deep cell (3, 0) (S17). The control signal includes control contents that after storage of the recording medium B, the recording medium A is delivered from the delivery source deep cell (4, 2) to the delivery destination cell (0, 0), and after delivery of the recording medium A, the recording medium B stored in the deep cell (3, 0) is delivered to the delivery source deep cell (4, 2) and housed therein again. According to the control signal, the accessor 12 performs removal, insertion and delivery of the recording media A and B with respect to each cell (delivery source, delivery destination and storage point candidate).

The total operations of the exemplary embodiment are described above. A specific example on calculation by the travel distance calculation means 107 (S13 in FIG. 15) described above is described with reference to FIG. 6 to FIG. 10.

Succeeding in searching the storage point candidate cell, the travel distance calculation means 107 carries out a flow in FIG. 6 and determines the calculation method. In each step in the flow in FIG. 6, the travel distance calculation means 107 refers to the first detection recording data 111 in the memory 11 and performs determination based thereon.

The travel distance calculation means 107 initially determines whether or not the recording medium to be stored (storage medium) is located in the delivery source cell (S31).

If the storage medium is not located in the delivery source cell (S31/NO), the travel distance calculation means 107 determines whether or not the storage medium is located in the storage destination cell (S37). If the storage medium is not located in the storage destination cell (S37/NO), the travel distance calculation means 107 does not perform any calculation. That is, since the storage operation is not necessary, a normal delivery of the recording medium is conducted. If the storage medium is located in the delivery destination cell (S37/YES), the travel distance calculation means 107 carries out a calculation method 2 (S39). The calculation method 2 is described below using FIG. 8.

If the storage medium is located in the delivery source cell (S31/YES), the travel distance calculation means 107 determines whether or not the storage medium is located in the delivery destination cell (S32). If the storage medium is not located in the delivery destination cell (S32/NO), the travel distance calculation means 107 carries out a calculation 1 (S35). The calculation method 1 is described below using FIG. 7. If the storage medium is located in the delivery destination cell (S32/YES), the travel distance calculation means 107 determines whether or not the standby position of the accessor 12 is close to the delivery source cell (including the same position as the delivery source cell).

If the standby position of the accessor 12 is not close to the delivery source cell (S33/NO), the travel distance calculation means 107 carries out a calculation method 3 (S34). The calculation method 3 is described below using FIG. 9. If the standby position of the accessor 12 is close to the delivery source cell (S33/YES), the travel distance calculation means 107 carries out a calculation method 4 (S36). The calculation method 4 is described below using FIG. 10.

The calculation method 1 is described using FIG. 7. The calculation method 1 is carried out when the storage medium is located only in the delivery source. FIG. 7 (a) and FIG. 7 (b) are diagrams illustrating side views of the magazine 14 (side where openings are arranged) like FIG. 2 (a). FIG. 7 (a) illustrates that the delivery source cell is a cell (4, 3), the standby position of the accessor 12 is a cell (4, 2), the searched storage point candidate cell is a cell (4, 2), and the delivery destination cell is a cell (0, 0). In this case, the storage medium in the delivery source (recording medium B which is housed on the opening side of the cell) is stored in the storage point candidate cell, and the storage medium (recording medium A which is housed on the back side of the cell) is delivered from the delivery source to the delivery destination. FIG. 7 (b) illustrates a travel order, a travel distance and a travel direction of the accessor 12 in such condition. In FIG. 7 (b), the accessor 12 moves in the order of D1 to D5.

The accessor 12 initially extracts, from the cell (4, 3) which is the standby position and the delivery source, the recording medium B (storage medium) housed on the opening side thereof. The accessor 12 delivers the extracted recording medium B to the cell (4, 2) searched as the storage point candidate cell and inserts it into the storage point candidate cell (D1). The recording medium B is then housed on the opening side of the cell. Next, the accessor 12 moves to the delivery source (4, 3) (D2). Then, the recording medium A which is housed on the back side of the cell (4, 3) is pushed by the medium pushing means due to extraction of the recording medium B and is housed on the opening side of the cell. The accessor 12 extracts the recording medium A from the cell (4, 3). The accessor delivers the extracted recording medium A to the delivery destination cell (0, 0) of the drive 13, and inserts it into the delivery destination cell (D3). The accessor 12 moves to the cell (4, 2) in which the recording medium B is currently stored (D4). Next, the accessor 12 extracts the recording medium B currently stored from the cell (4, 2). The accessor 12 delivers the extracted recording medium B to the delivery source cell (4, 3) and inserts it into the delivery source cell (D5). The recording medium B is, then, housed on the opening side of the cell. A series of travel operations are described above. The travel distance calculation means 107 calculates distances in D1 to D5 to calculate the total travel distance. Formulas of the calculation method 1 are described below (ABS represents an absolute value).

$D1 = $ABS(delivery source coordinate−storage point candidate coordinate)

$D2 = $ABS(storage point candidate coordinate−delivery source coordinate)

$D3 = $ABS(delivery source coordinate−delivery destination coordinate)

$D4 = $ABS(delivery destination coordinate−storage point candidate coordinate)

$D5 = $ABS(storage point candidate coordinate−delivery source coordinate)

$D$(total travel distance)$=D1+D2+D3+D4+D5$

The example in FIG. 7 is described as follows.

$D1 = $ABS$((4, 3)-(4, 2))=(0, 1)$ $D2 = $ABS$((4, 2)-(4, 3))=(0, 1)$ $D3 = $ABS$((4, 3)-(0, 0))=(4, 3)$ $D4 = $ABS$((0, 0)-(4, 2))=(4, 2)$ $D5 = $ABS$((4, 2)-(4, 3))=(0, 1)$ $D=(0, 1)+(0, 1)+(4, 3)+(4, 2)+(0, 1)=(8, 8)$

If the cell (4, 2) is the storage point candidate, it is predicted that the accessor 12 is required to move by 8 in an x-axis direction and by 8 in a y-axis direction. The travel distance calculation means 107 associates the position of the storage point candidate cell (4, 2) with the calculated travel distance (8, 8), and stores them in the memory 11 as the travel distance data 114.

In the example in FIG. 7, since the standby position of the accessor 12 is equal to the position of the delivery source, travel from the standby position of the accessor 12 to the delivery source is not performed. Therefore, the following formula is omitted, $D0=$ABS(standby position coordinate of the accessor−delivery source coordinate)$=$ABS$((4, 3)-(4, 3))=(0, 0)$.

Therefore, if the standby position of the accessor 12 is not equal to the position of the delivery source and travel from the standby position of the accessor 12 to the delivery source is performed, a value calculated by the formula of D0 is added to the total travel distance D.

The calculation method 2 is described using FIG. 8. The calculation method 2 is performed when the storage medium is located only in the delivery destination. FIG. 8 (a) and FIG. 8 (b) are diagrams illustrating side views of the magazine 14 (side where openings are arranged) like FIG. 2 (a). FIG. 8 (a) illustrates the delivery source cell is (0, 0), the standby position of the accessor is (1, 0), the searched storage point candidate cell is (4, 2), and the delivery destination cell is (4, 3). In this case, suppose that the storage medium (recording medium B) housed in the delivery source cell is stored in the storage point candidate cell, and the recording medium A is delivered from the delivery source to the delivery destination. FIG. 8 (b) illustrates a movement order, a travel distance and a travel direction of the accessor 12 in such condition. In FIG. 8 (b), the accessor 12 moves in the order of D1 to D6.

The accessor 12 initially moves from the cell (1, 0) which is the standby position to the deliver destination cell (4, 3) (D1). At this time, the recording medium B is housed on the opening side in the cell. The accessor 12 extracts the recording medium B from the cell (4, 3). The accessor 12 delivers the extracted recording medium B to the cell (4, 2) which is searched as the storage point candidate cell, and inserts it into the storage point candidate cell (D2). In this case, the recording medium B is housed on the opening side in the cell. The accessor 12 moves to the delivery source cell (0, 0) (D3). The accessor 12 extracts the recording medium A from the cell (0, 0). The accessor 12 delivers the extracted recording medium A to the delivery destination cell (4, 3), and inserts it into the delivery destination cell (D4). At this time, the recording medium A is housed on the opening side in the cell. The accessor 12 moves to the cell (4, 2) in which the recording medium currently stored (D5). Next, the accessor 12 extracts the stored recording medium B from the cell (4, 2). The accessor 12 delivers the extracted recording medium B to the delivery destination cell (4, 3), and inserts it into the delivery destination cell (D6). At this time, the recording medium A which is housed on the opening side in the cell is pushed by the recording medium B and moves to the back side in the cell. At the same time, the medium pushing means is pushed by the recording medium A to shrink. Thereby, the recording medium A is housed on the back side of the delivery destination cell (4, 3) and the recording medium B is housed on the opening side thereof. A series of travel operations are described above. The travel distance calculation means 107 calculates distances in D1 to D6 to calculate the total travel distance. Formulas in the calculation method 2 are described below (ABS means an absolute value).

$D1$=ABS(accessor standby position coordinate−delivery destination coordinate)

$D2$=ABS(delivery destination coordinate−storage point candidate coordinate)

$D3$=ABS(storage point candidate coordinate−delivery source coordinate)

$D4$=ABS(delivery source coordinate−delivery destination coordinate)

$D5$=ABS(delivery destination coordinate−storage point candidate coordinate)

$D6$=ABS(storage point candidate coordinate−delivery destination coordinate)

$D$(total travel distance)=$D1+D2+D3+D4+D5+D6$

The example in FIG. 8 is described as follows.

$D1$=ABS((1, 0)−(4, 3))=(3, 3)

$D2$=ABS((4, 3)−(4, 2))=(0, 1)

$D3$=ABS((4, 2)−(0, 0))=(4, 2)

$D4$=ABS((0, 0)−(4, 3))=(4, 3)

$D5$=ABS((4, 3)−(4, 2))=(0, 1))

$D6$=ABS((4, 2)−(4, 3))=(0, 1)

$D$=(3, 3)+(0, 1)+(4, 2)+(4, 3)+(0, 1)+(0, 1)=(11, 11)

It is predicted that the accessor 12 is required to move by 11 in the x-axis direction and by 11 in the y-axis direction, if the cell (4, 2) is the storage point candidate. The travel distance calculation means 107 associates the position of the storage point candidate cell (4, 2) with the calculated travel distance (11, 11), and stores them in the memory 11 as the travel distance data 114.

The calculation method 3 is described using FIG. 9. The calculation method 3 is performed when the storage media are located in both the delivery source and the delivery destination and the standby position of the accessor 12 is not close to the delivery source (i.e. close to the delivery destination). FIG. 9 (*a*) and FIG. 9 (*b*) are diagrams illustrating side views of the magazine 14 (side where openings are arranged) like FIG. 2 (*a*). FIG. 9 (*a*) illustrates, as an example, the delivery source cell is (1, 3), the standby position of the accessor is (3, 1), one of the two searched storage point candidate cells is a storage point candidate 1 (4, 2) and another thereof is a storage point candidate 2 (1, 2), and the delivery destination cell is (4, 3). In this case, suppose that the storage medium (recording medium C) housed in the delivery destination cell is stored in the storage point candidate cell 1, the storage medium (recording medium B) housed in the delivery source cell is stored in the storage point candidate cell 2, and the recording medium A is delivered from the delivery source to the delivery destination. FIG. 9 (*b*) illustrates a movement order, a travel distance and a travel direction of the accessor 12 in such condition. In FIG. 9 (*b*), the accessor 12 moves in the order of D1 to D10. In the example, storage in the delivery destination is initially performed since the standby position of the accessor 12 is closer to the delivery destination than to the delivery source.

The accessor 12 initially moves from the cell (3, 1) which is the standby position to the delivery destination cell (4, 3) (D1). At this time, the recording medium C (storage medium) is housed on the opening side in the cell. The accessor 12 extracts the recording medium C from the cell (4, 3). The accessor 12 delivers the extracted recording medium C to the cell (4, 2) which is searched as the storage point candidate cell 1 and inserts it into the storage point candidate cell 1 (D2). The recording medium C is housed on the opening side in the cell. After that, the accessor 12 moves to the delivery source cell (1, 3) (D3). At this time, the recording medium B (storage medium) is housed on the opening side in the cell, and the recording medium A is housed on the back side therein. The accessor 12 extracts the recording medium B from the cell (1, 3). The accessor 12 delivers the extracted recording medium B to the cell (1, 2) which is searched as the storage point candidate cell 2 and inserts it into the storage point candidate cell 2 (D4). The recording medium B is housed on the opening side in the cell. Next, the accessor 12 moves to the delivery source cell (1, 3) (D5). At this time, the recording medium A which is housed on the back side in the delivery source cell (1, 3) is pushed by the medium pushing means due to extraction of the recording medium B and is housed on the opening side in the cell. The accessor 12 extracts the recording medium A from the cell (1, 3). The accessor 12 delivers the extracted recording medium A to the delivery destination cell (4, 3), and inserts it into the delivery destination cell (D6). The recording medium A is housed on the opening side in the cell. Next, the accessor 12 moves to the cell (4, 2) in which the recording medium C is currently stored (D7). The accessor 12 extracts the recording medium C currently stored from the cell (4, 2). The accessor 12 delivers the extracted recording medium C to the delivery destination cell (4, 3), and inserts it into the delivery destination cell (D8). At this time, the recording medium A which is housed on the opening side in the cell is pushed by the recording medium C to move to the back side in the cell. At the same time, the medium pushing means is pushed by the recording medium A to shrink. Thereby, in the delivery destination cell (4, 3), the recording medium A is housed on the back side therein and the recording medium C is housed on the opening side therein. Next, the accessor 12 moves to the cell (1, 2) in which the recording medium B is currently stored (D9). The accessor 12 extracts the recording medium B which is currently stored, from the cell (1, 2). The accessor 12 delivers the extracted recording medium B to the delivery source cell (1, 3), and inserts it into the delivery source cell (D10). A series of travel operations are described above. The travel distance calculation means 107 calculates the total travel distance by calculating the distance D1 to the distance D10. Formulas of the calculation method 3 are described below (ABS means an absolute value).

$D1$=ABS(accessor standby position coordinate−delivery destination coordinate)

$D2=\text{ABS}(\text{delivery destination coordinate}-\text{storage point candidate 1 coordinate})$ $D3=\text{ABS}(\text{storage point candidate 1 coordinate}-\text{delivery source coordinate})$ $D4=\text{ABS}(\text{delivery source coordinate}-\text{storage point candidate 2 coordinate})$ $D5=\text{ABS}(\text{storage point candidate 2 coordinate}-\text{delivery source coordinate})$ $D6=\text{ABS}(\text{delivery source coordinate}-\text{delivery destination coordinate})$ $D7=\text{ABS}(\text{delivery destination coordinate}-\text{storage point candidate 1 coordinate})$ $D8=\text{ABS}(\text{storage point candidate 1 coordinate}-\text{delivery destination coordinate})$ $D9=\text{ABS}(\text{delivery destination coordinate}-\text{storage point candidate 2 coordinate})$ $D10=\text{ABS}(\text{storage point candidate 2 coordinate}-\text{delivery source coordinate})$ $D(\text{total travel distance})=D1+D2+D3+D4+D5+D6+D7+D8+D9+D10$ The example in FIG. 9 is described as follows.

$D1=\text{ABS}((3,1)-(4,3))=(1,2)$ $D2=\text{ABS}((4,3)-(4,2))=(0,1)$ $D3=\text{ABS}((4,2)-(1,3))=(3,1)$ $D4=\text{ABS}((1,3)-(1,2))=(0,1)$ $D5=\text{ABS}((1,2)-(1,3))=(0,1)$ $D6=\text{ABS}((1,3)-(4,3))=(3,0)$ $D7=\text{ABS}((4,3)-(4,2))=(0,1)$ $D8=\text{ABS}((4,2)-(4,3))=(0,1)$ $D9=\text{ABS}((4,3)-(1,2))=(3,1)$ $D10=\text{ABS}((1,2)-(1,3))=(0,1)$ $D=(1,2)+(0,1)+(3,1)+(0,1)+(0,1)+(3,0)+(0,1)+(0,1)+(3,1)+(0,1)=(10,10)$ Therefore, if the cells (4, 2) and (1, 2) are the storage point candidates 1 and 2, respectively, it is predicted that the accessor 12 is required to move by 10 in the x-axis direction and move by 10 in the y-axis direction. The travel distance calculation means 107 associates the positions (4, 2) and (1, 2) of the storage point candidate cells with the calculated travel distance (10, 10), and stores them in the memory 11 as the travel distance data 114.

The calculation method 4 is described using FIG. 10. The calculation method 4 is performed when the storage media are located in both the delivery source and the delivery destination and the standby position of the accessor 12 is close to the delivery source. FIG. 10 (*a*) and FIG. 10 (*b*) are diagrams illustrating side views of the magazine 14 (side where openings are arranged) like FIG. 2 (*a*). FIG. 10 (*a*) illustrates, for example, the delivery source cell is (1, 3), the standby position of the accessor is (2, 1), one of the two searched storage point candidate cells is a storage point candidate cell 1 (4, 2) and another thereof is a storage point candidate cell 2 (1, 2), and the delivery destination cell is (4, 3). In this case, suppose that the storage medium (recording medium C) housed in the delivery destination cell is stored in the storage point candidate cell 1, the storage medium (recording medium B) housed in the delivery source cell is stored in the storage point candidate cell 2, and the recording medium A is delivered from the delivery source to the delivery destination. FIG. 10 (*b*) illustrates a movement order, a travel distance and a travel direction of the accessor 12 in such condition. In FIG. 10 (*b*), the accessor 12 moves in the order of D1 to D10. In the example, storage in the delivery source is initially performed since the standby position of the accessor 12 is closer to the delivery source than to the delivery destination.

The accessor 12 initially moves from the cell (2, 1) which is the standby position to the delivery source cell (1, 3) (D1). At this time, the recording medium B (storage medium) is housed on the opening side in the cell and the recording medium A is housed on the back side in the cell. The accessor 12 extracts the recording medium B from the cell (1, 3). The accessor 12 delivers the extracted recording medium B to the cell (1, 2) which is searched as the storage point candidate cell 2 and inserts it into the storage point candidate cell 2 (D2). The recording medium B is housed on the opening side in the cell. Next, the accessor 12 moves to the delivery destination cell (4, 3) (D3). At this time, the recording medium C is housed on the opening side in the cell. The accessor 12 extracts the recording medium C from the cell (4, 3). The accessor 12 delivers the extracted recording medium C to the cell (4, 2) which is searched as the storage point candidate cell 1 and inserts it into the storage point candidate cell 1 (D4). Next, the accessor 12 moves to the delivery source cell (1, 3) (D5). At this time, the recording medium A which is housed on the back side in the delivery source cell (1, 3) is pushed by the medium pushing means due to extraction of the recording medium B and is housed on the opening side in the cell. The accessor 12 extracts the recording medium A from the cell (1, 3). The accessor 12 delivers the extracted recording medium A to the delivery destination cell (4, 3), and inserts it into the delivery destination cell (D6). The recording medium A is housed on the opening side in the cell. Next, the accessor 12 moves to the cell (4, 2) in which the recording medium C is currently stored (D7). The accessor 12 extracts the recording medium C which is currently stored, from the cell (4, 2). The accessor 12 delivers the extracted recording medium C to the delivery destination cell (4, 3), and inserts it into the delivery destination cell (D8). At this time, the recording medium A which is housed on the opening side in the cell is pushed by the recording medium C and moves to the back side in the cell. At the same time, the medium pushing means is pushed by the recording medium A to shrink. Thereby, in the delivery destination cell (4, 3), the recording medium A is housed on the back side therein and the recording medium C is housed on the opening side therein. Next, the accessor 12 moves to the cell (1, 2) in which the recording medium B is currently stored (D9). The accessor 12 extracts the recording medium B which is currently stored, from the cell (1, 2). The accessor 12 delivers the extracted recording medium B to the delivery source cell (1, 3), and inserts it into the delivery source cell (D10). A series of the travel operations are described above. The travel distance calculation means 107 calculates the total travel distance by calculating the distance D1 to the distance D10. Formulas of the calculation method 4 are described below (ABS means an absolute value).

$D1=\text{ABS}(\text{accessor standby position coordinate}-\text{delivery source coordinate})$ $D2=\text{ABS}(\text{delivery source coordinate}-\text{storage point candidate 2 coordinate})$ $D3=\text{ABS}(\text{storage point candidate 2 coordinate}-\text{delivery destination coordinate})$ $D4=\text{ABS}(\text{delivery destination coordinate}-\text{storage point candidate 1 coordinate})$ $D5=\text{ABS}(\text{storage point candidate 1 coordinate}-\text{delivery source coordinate})$ $D6=\text{ABS}(\text{delivery source coordinate}-\text{delivery destination coordinate})$ $D7=\text{ABS}(\text{delivery destination coordinate}-\text{storage point candidate 1 coordinate})$ $D8=\text{ABS}(\text{storage point candidate 1 coordinate}-\text{delivery destination coordinate})$ $D9=\text{ABS}(\text{delivery destination coordinate}-\text{storage point candidate 2 coordinate})$ $D10=\text{ABS}(\text{storage point candidate 2 coordinate}-\text{delivery source coordinate})$ $D(\text{total travel distance})=D1+D2+D3+D4+D5+D6+D7+D8+D9+D10$ The example in FIG. 10 is described as follows.

$D1=\text{ABS}((2,1)-(1,3))=(1,2)$ $D2=\text{ABS}((1,3)-(1,2))=(0,1)$ $D3=\text{ABS}((1,2)-(4,3))=(3,1)$ $D4=\text{ABS}((4,3)-(4,2))=(0,1)$ $D5=\text{ABS}((4,2)-(1,3))=(3,1)$ $D6=\text{ABS}((1,3)-(4,3))=(3,0)$ $D7=\text{ABS}((4,3)-(4,2))=(0,1)$ $D8=\text{ABS}((4,2)-(4,3))=(0,1)$ $D9=\text{ABS}((4,3)-(1,2))=(3,1)$ $D10=\text{ABS}((1,2)-(1,3))=(0,1)$ $D=(1,2+(0,1+(3,1+(0,1+(3,1+(3,0+(0,1+(0,1)+(3,1)+(0,1)=(13,10)$ Therefore, if the cells (4, 2) and (1, 2) are the storage point candidates 1 and 2, respectively, it is predicted that the accessor 12 is required to move by 13 in the x-axis direction and move by 10 in the y-axis direction. The travel distance calculation means 107 associates the positions (4, 2) and (1, 2) of the storage point candidate cells with the calculated travel distance (13, 10), and stores them in the memory 11 as the travel distance data 114.

As described above, in the exemplary embodiment, the library device 1 works so that a storage point candidate, the accessor's travel distance to which is the shortest is searched, and storage of the recording medium is performed with respect to the cell in which a predetermined threshold is not exceeded in the searched storage point candidates. Thereby, the library device 1 avoids not only wear of the medium pushing means of the specific cell in the magazine 14 caused by the large number of removals and insertions, but wear of the drive means of the accessor 12 which occurs due to a long travel distance. The library device 1 avoids wear of the medium storage means (magazine 14) and the medium delivery means (accessor 12) as the means related to delivery of the recording medium and can extend the length of life.

In the exemplary embodiment, the example that the travel distance of the accessor is calculated for each storage point candidate cell. However, a travel time of the accessor may be calculated. In the case, the travel distance calculation means 107 becomes the travel time calculation means and the travel distance data 114 becomes the travel time data in FIG. 4. The travel time calculation means calculates the travel distance for each searched storage point candidate cell just as the travel distance calculation means 107 does, calculates the travel time using the travel velocity of the accessor which is set in the memory 11 in advance (the velocity in the x-axis may be different from that in the y-axis), and stores it in the memory 11 as the travel time data. The travel time data includes the position of the storage point candidate cell and the calculated travel time which is associated therewith. After that, the number-retrieval determining means 104 refers to the travel time data, searches the storage point candidate cell with the shortest travel time, and determines whether or not the number of removals and insertions in the cell exceeds the threshold 113.

[Third Exemplary Embodiment]

A configuration of the library device of the exemplary embodiment is described using FIG. 11. FIG. 11 only illustrates configurations of the CPU 10 and the memory 11. The other configuration is not shown in FIG. 11 since the configuration is similar to that of the first exemplary embodiment shown in FIG. 1. The library device 1 of the exemplary embodiment includes the CPU 10, the memory 11, the accessor 12, the magazine 14, and the drive 13, which are connected to each other through the data bus which is not shown. The library device 1 of the exemplary embodiment connects to the higher-level device 2.

As shown in FIG. 11, in the CPU 10 and the memory 11 of the exemplary embodiment, the CPU 10 lacks the second detection recording means 102, the number-retrieval determining means 104, and the threshold update means 106 and the memory 11 lacks the detection recording data 112 and the threshold 113, compared with the configuration shown in FIG. 4. In the exemplary embodiment, the threshold determination with respect to the number of removals and insertions in the storage point candidate, which is described in the first and the second description, is not performed, and the calculation of the accessor travel distance for each storage point candidate and use of the storage point candidate, the travel distance to which is the shortest, are only preformed. The means and the data shown in FIG. 11 are the same as the first and the second exemplary embodiment, and descriptions thereof are omitted since those are described above.

Operations of the library device of the exemplary embodiment are described using a flowchart of FIG. 12. FIG. 2 is also used as an example.

After the magazine 14 is arranged in the library device 1, the first detection recording means 101 performs detection and recording (S21). As exemplified in FIG. 2 (a) and FIG. 2 (b), the recording media A and B are housed in the deep cell (4, 2) here. The deep cell (4, 2) is the delivery source. As an example, the accessor 12 stands by in front of the deep cell (4, 3). The deep cell (4, 3) is the standby position.

Suppose that the CPU 10 receives, for example, an instruction of "reproduction (read) of the recording medium A" from the higher-level device 2. An example, here, the recording drive A is delivered to the cell (0, 0) in the drive 13. The cell (0, 0) is the delivery destination.

The storage point candidate searching means 103 refers to the first detection recording data 111 in the memory 11, searches a cell which can be the storage point candidate, that is, a cell which can house at least one recording medium, near the delivery source deep cell (4, 2) (S22). Details of the searching method are not described here since they are described in the first embodiment. In an example described below, the storage point candidate searching means 103 starts searching from the top row cell to the bottom row cell in the column including the delivery source while shifting the column in order, every time the storage point candidate cell is found, the position (coordinate) of the cell is stored in the memory 11, and all the cells are searched at once.

If the storage point candidate searching by the storage point candidate searching means 103 fails (S23/NO), that is, if any cell which can be the storage point candidate is not found in all the cells in the magazine 14 and the drive 13, the library device 1 ends a series of processes. In this case, storage of the recording medium is not performed. If the storage point candidate searching succeeds (S23/YES), S24 is performed. As an example, the deep cell (4, 4) and the deep cell (3, 0) are searched as the storage point candidate cell. The positions (coordinate) of the searched storage point candidate cells are stored in the memory 11 in order of searching by the storage point candidate searching means 103.

The travel distance calculation means 107 calculates a travel distance for each storage point candidate cell searched by the storage point candidate searching means 103 based on each position (coordinate) of the delivery source, the delivery destination, the standby position, and the storage point candidate (S24). The travel distance calculation means 107 calculates here the travel distance with respect to the storage point candidate cell (4, 4) based on the delivery source (4, 2), the delivery destination (0, 0), the standby position (4, 3) and the storage point candidate (4, 4). The travel distance calculation means 107 further calculates the travel distance with respect to the storage point candidate cell (3, 0) based on the delivery source (4, 2), the delivery destination (0, 0), the standby position (4, 3) and the storage point candidate (3, 0). The specific example of the calculation method of the travel distance (formula) is described in the second exemplary embodiment. The travel distance calculation means 107 stores each calculated travel distance in the memory 11 as the travel distance data 114. In the travel distance data 114, the position of the storage point candidate cell is associated with the calculated travel distance.

The medium-delivery control means 105 refers to the travel distance data 114 in the memory 11, searches the storage point candidate cell, the travel distance to which is the shortest, and controls the accessor 12 so that the recording medium is stored in the searched storage point candidate cell (S25). As example, suppose that the storage point candidate cell, the travel distance to which is the shortest is the deep cell (4, 4) here. The medium-delivery control means 105 transmits the control signal to the accessor 12 so that the recording medium B is stored from the delivery source deep cell (4, 2) to the storage point candidate deep cell (4, 4), the travel distance to which is the shortest. The control signal includes the contents of control in which the recording medium A is delivered from the delivery source deep cell (4, 2) to the delivery destination cell (0, 0) after storage of the recording medium B, and the recording medium B which is stored in the deep cell (4, 4) is delivered to the delivery source deep cell (4, 2) and housed therein again after storage of the recording medium A. The accessor 12 performs removal, insertion, and delivery of the recording media A and B for each cell (delivery source, delivery destination, and storage point candidate) in accordance with the control signal.

As described above, in the exemplary embodiment, the library device 1 searches the storage point candidate, the accessor's travel distance to which is the shortest and performs control so that the recording medium is stored in the searched storage point candidate cell. Thereby, the library device 1 can avoids wear of (the drive means of) the accessor 12 caused by a long travel distance. The library device 1 can avoid wear of a medium delivery means (accessor 12) which is a means related to the delivery of the recording medium and extend the length of the life.

In the exemplary embodiment, the example that the travel distance of the accessor is calculated for each storage point candidate cell is described. However, the travel time of the accessor may be calculated. As described in the second exemplary embodiment, in FIG. 4, the travel distance calculation means 107 may be replaced by the travel time calculation means and the travel distance data 114 may be replaced by the travel time data. Operations of the travel time calculation means are described in the second exemplary embodiment, and descriptions thereon are therefore omitted.

[Third Exemplary Embodiment]

The exemplary embodiments 1 and 2 above described may be configured as follows.

Operations in the exemplary embodiments 1 and 2 may be performed by using hardware, software, or complex configuration thereof.

If the software processing is performed, a program including a process sequence may be installed in memory in a computer arranged in special hardware and may be executed. Otherwise, the program may be installed in a generalized computer which is capable of executing various processing and may be executed.

The program may be stored in advance in a hard disc or a ROM (Read Only Memory) as the recording medium. The program may be temporarily or permanently housed (stored) in a removable recording medium, like a CD-ROM (Compact Disc Read Only Memory), a MO (Magnet optical) disc, a DVD (Digital Versatile Disc), a magnetic disc, and a semiconductor memory. Such removal recording media may be provided as package software.

The program may be installed from the removable recording media to the computer, or may be wireless-transferred from a download site. The program may be wired-transferred to a computer through a network, like a LAN (Local Area Network) and Internet. In the computer, the transferred program is received and may be installed in the recording medium, like a built-in hard disc.

The program is performed in time series order in accordance with the processing operations described in the exemplary embodiments 1 and 2 and may be configured to perform separately or in parallel in accordance with a processing ability or necessity of a process performing device.

In the exemplary embodiments 1 and 2, the whole library device is described as an example of the medium delivery control apparatus of the present invention. However, the CPU 10 and the memory 11, or only the CPU 10 may be recognized as an example of the medium delivery control apparatus of the present invention. In this case, it may be attached to an existing library device (device without features described in each exemplary embodiment) later (irrespective of whether it is attached inside or outside).

While having described an invention of the present application referring to the embodiments 1 to 3, the invention of the present application is not limited to the above mentioned embodiments 1 to 3. It is to be understood that to the configurations and details of the invention of the present application, various changes can be made within the scope of the invention of the present application by those skilled in the art.

This application claims priority from Japanese Patent Application No. 2010-005156 filed on Jan. 13, 2010, the contents of which are incorporation herein by reference in their entirety.

Explanation on Reference Numeral 1 library device
2 higher-level device
10 CPU
11 memory
12 accessor
13 drive
14 magazine
101 first detection recording means
102 second detection recording means
103 storage point candidate searching means
104 number-retrieval determining means
105 medium-delivery control means
106 threshold update means
107 travel distance calculation means
111 first detection recording data
112 second detection recording data
113 threshold
114 travel distance data

The invention claimed is:

1. A medium delivery control apparatus controlling a medium delivery unit performing removal, insertion and delivery of a recording medium with respect to a medium storage unit including a plurality of deep cells capable of housing a plurality of recording media in a depth direction from an opening of the cell and a recording reproduction unit performing reading and writing on the recording medium, the apparatus comprising:

a first detection recording unit to detect and record, for each deep cell, whether or not the recording medium is housed and which the recording medium is if the recording medium is housed;

a second detection recording unit to detect and record, for each deep cell, the number of removals and insertions of the recording medium;

a storage point candidate searching unit to search a storage point candidate cell storing the recording medium that is housed in at least one of a delivery source cell and a delivery destination cell on the basis of the record by the first detection recording unit;

a number-retrieval determining unit to retrieve the number of removals and insertions of the recording medium in the storage point candidate cell searched by the storage point candidate searching unit, and to determine whether or not the retrieved number of times exceeds a predetermined threshold on the basis of the record by the second detection recording unit; and a medium-delivery control unit to control the medium delivery unit so that the recording medium is stored in the searched storage point candidate cell if the threshold is not exceeded and for controlling the medium delivery unit so that the recording medium is not stored in the searched storage point candidate cell if the threshold is exceeded, in accordance with the determination of the number-retrieval determining unit.

2. The medium delivery control apparatus according to claim 1, further comprising:

a threshold update unit to update the predetermined threshold when the storage point candidate searching unit searches whether or not it is possible to be the storage point candidate cell with respect to all the deep cell included in the medium storage unit and when the number-retrieval determining unit determines that any of the number of removals and insertions of the recording medium in the storage point candidate cell exceeds the predetermined threshold, wherein the number-retrieval determining unit determines again whether or not the number of removals and insertions of the recording medium in the storage point candidate cell exceeds the threshold updated by the threshold update unit.

3. The medium delivery control apparatus according to claim 1, further comprising:

a travel distance calculation unit to calculate a travel distance of the medium delivery unit required for delivery of the recording medium on the basis of a position of the storage point candidate cell searched by the storage point candidate searching unit, a position of a delivery source, a position of a delivery destination and a current standby position of the medium delivery unit, wherein the storage point candidate searching unit searches the storage point candidate cell targeting all the deep cell included in the medium storage unit, the travel distance calculation unit calculates the travel distance of the medium delivery unit for each storage point candidate cell searched by the storage point candidate searching unit, and the number-retrieval determining unit retrieves the number of removals and insertions of the recording medium in the storage point candidate cell, the travel distance to which is the shortest, the travel distance being calculated by the travel distance callculation unit.

4. The medium delivery control apparatus according to claim 1, wherein, two different values are preliminarily set as the threshold, the two different values including a first threshold which is used when the storage point candidate cell searched by the storage point candidate searching unit is the deep cell of the medium storage unit and a second threshold which is used when the storage point candidate cell searched by the storage point candidate searching unit is the cell of the recording reproduction unit, and the number-retrieval determining unit determines the first threshold or the second threshold depending on whether the storage point candidate cell searched by the storage point candidate searching unit is the deep cell of the medium storage unit or the cell of the recording reproduction unit, and performs the determination using the determined threshold.

5. A medium delivery control apparatus controlling a medium delivery unit performing removal, insertion and delivery of a recording medium with respect to a medium storage unit including a plurality of deep cells capable of housing a plurality of recording media in a depth direction from an opening of the cell and a recording reproduction unit performing reading and writing on the recording medium, the apparatus comprising:

a first detection recording unit to detect and record, for each deep cell, whether or not a recording medium is housed and which the recording medium is if the recording medium is housed;

a storage point candidate searching unit to search a storage point candidate cell storing the recording medium that is housed in at least one of a delivery source cell and a delivery destination cell on the basis of the record by the first detection recording unit;

a travel distance calculation unit to calculate a travel distance of the medium delivery unit required for delivery of the recording medium for each storage point candidate cell searched by the storage point candidate searching unit on the basis of a position of the searched storage point candidate cell, a position of a delivery source, a position of a delivery destination and a current standby position of the medium delivery unit; and a medium-delivery control unit to control the medium delivery unit so that the recording medium is stored in the storage point candidate cell, the travel distance to which is the shortest, the travel distance being calculated by the travel distance calculation unit.

6. A medium delivery control method which is performed by an apparatus controlling a medium delivery unit performing removal, insertion and delivery of a recording medium with respect to a medium storage unit including a plurality of deep cells capable of housing a plurality of recording media in a depth direction from an opening of the cell and a recording reproduction unit performing reading and writing on the recording medium, the method comprising:

detecting and recording, for each deep cell, whether or not a recording medium is stored and which the recording medium is if the recording medium is stored;

detecting and recording the number of removals and insertions of the recording medium for each deep cell;

searching a storage point candidate cell storing the recording medium that is stored in at least one of a delivery source cell and a delivery destination cell on the basis of the record in the recording of the each cell;

retrieving the number of removals and insertions of the recording medium in the searched storage point candidate cell and determining whether or not the retrieved number of times exceeds a predetermined threshold on the basis of the record in the recording of the number of removals and insertions; and controlling the medium delivery unit so that the recording medium is stored in the searched storage point candidate cell if the threshold is not exceeded and for controlling the medium delivery unit so that the recording medium is not stored in the searched storage point candidate cell if the threshold is exceeded, in accordance with the determination in the determining.

7. A medium delivery control method which is performed by an apparatus controlling a medium delivery unit performing removal, insertion and delivery of a recording medium with respect to a medium storage unit including a plurality of deep cells capable of housing a plurality of recording media in a depth direction from an opening of the cell and a recording reproduction unit performing reading and writing on the recording medium, the method comprising:

detecting and recording, for each deep cell, whether or not a recording medium is housed and which the recording medium is if the recording medium is housed;

searching a storage point candidate cell storing the recording medium that is housed in at least one of a delivery source cell and a delivery destination cell on the basis of the record in the recording of the cell;

calculating a travel distance of the medium delivery unit required for delivery of the recording medium for each storage point candidate cell searched on the basis of a position of the searched storage point candidate cell, a position of a delivery source, a position of a delivery destination and a current standby position of the medium delivery unit; and controlling the medium delivery unit so that the recording medium is stored in the storage point candidate cell, the travel distance to which is the shortest, the travel distance being calculated.

8. A non-transitory computer-readable medium stored a computer program controlling a medium delivery unit performing removal, insertion and delivery of a recording medium with respect to a medium storage unit including a plurality of deep cells capable of housing a plurality of recording media in a depth direction from an opening of the cell and a recording reproduction unit performing reading and writing on the recording medium, the program causing a computer to execute:

a first detection recording processing to detect and record for each deep cell, whether or not a recording medium is housed and which the recording medium is if the recording medium is housed;

a second detection recording processing to detect and record the number of removals and insertions of the recording medium for each deep cell;

a storage point candidate searching processing to search a storage point candidate cell storing the recording medium that is housed in at least one of a delivery source cell and a delivery destination cell on the basis of the record by the first detection recording processing;

a number-retrieval determining processing to retrieve the number of removals and insertions of the recording medium in the storage point candidate cell searched by the storage point candidate searching processing and determining whether or not the retrieved number of times exceeds a predetermined threshold on the basis of the record by the second detection recording processing; and a medium delivery control processing to control the medium delivery unit so that the recording medium is stored in the searched storage point candidate cell if the threshold is not exceeded and for controlling the medium delivery unit so that the recording medium is not stored in the searched storage point candidate cell if the threshold is exceeded, in accordance with the determination by the number-retrieval determining processing.

9. A non-transitory computer-readable medium stored a computer program controlling a medium delivery unit performing removal, insertion and delivery of a recording medium with respect to a medium storage unit including a plurality of deep cells capable of housing a plurality of recording media in a depth direction from an opening of the cell and a recording reproduction unit performing reading and writing on the recording medium, the program causing a computer to execute:

a first detection recording processing to detect and record, for each deep cell, whether or not a recording medium is housed and which the recording medium is if the recording medium is housed;

a storage point candidate searching processing to search a storage point candidate cell storing the recording medium that is housed in at least one of a delivery source cell and a delivery destination cell on the basis of the record by the first detection recording processing;

a travel distance calculation processing to calculate a travel distance of the medium delivery unit required for delivery of the recording medium for each storage point candidate cell searched in the storage point candidate searching processing on the basis of a position of a searched storage point candidate cell, a position of a delivery source, a position of a delivery destination and a current standby position of the medium delivery unit; and a medium delivery control processing to control the medium delivery unit so that the recording medium is stored in the storage point candidate cell, the travel distance to which is the shortest, the travel distance being calculated in the travel distance calculation processing.

\* \* \* \* \*

UNITED STATES PATENT AND TRADEMARK OFFICE
CERTIFICATE OF CORRECTION

| | | |
|---|---|---|
| PATENT NO. | : 8,483,021 B2 | Page 1 of 1 |
| APPLICATION NO. | : 13/521957 | |
| DATED | : July 9, 2013 | |
| INVENTOR(S) | : Shin Sato | |

It is certified that error appears in the above-identified patent and that said Letters Patent is hereby corrected as shown below:

In the Specification

Column 16, Line 64: Delete "calculation 1" and insert -- calculation method 1 --

Column 23, Line 47-48: Delete "D=(1, 2+(0, 1+(3, 1+(0, 1+(3, 1+(3, 0+(0, 1+(0, 1)+(3, 1)+(0, 1)= (13, 10)" and insert -- D=(1, 2)+(0, 1)+(3, 1)+(0, 1)+(3, 1)+(3, 0)+(0, 1)+(0, 1)+(3, 1)+(0, 1)= (13, 10) --

Signed and Sealed this
Eleventh Day of November, 2014

Michelle K. Lee
*Deputy Director of the United States Patent and Trademark Office*